(12) United States Patent
Oishi

(10) Patent No.: US 7,086,074 B2
(45) Date of Patent: Aug. 1, 2006

(54) DISK CARTRIDGE

(75) Inventor: Kengo Oishi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 241 days.

(21) Appl. No.: 10/866,682

(22) Filed: Jun. 15, 2004

(65) Prior Publication Data

US 2004/0226033 A1 Nov. 11, 2004

Related U.S. Application Data

(62) Division of application No. 10/223,439, filed on Aug. 20, 2002, now Pat. No. 6,789,261.

(30) Foreign Application Priority Data

Aug. 21, 2001 (JP) .......... 2001-250651

(51) Int. Cl.
*G11B 23/03* (2006.01)

(52) U.S. Cl. .......... 720/740
(58) Field of Classification Search .......... 720/740, 720/719, 616, 631; 360/133, 132; 369/291.1
See application file for complete search history.

(56) References Cited

U.S. PATENT DOCUMENTS 6,307,712 B1 * 10/2001 Meguro et al. .......... 360/133
6,327,117 B1 * 12/2001 Meguro .......... 360/133
6,438,099 B1    8/2002 Park et al.
6,477,137 B1   11/2002 Takahashi
6,538,984 B1 *  3/2003 Sanada et al. .......... 720/631
6,687,216 B1    2/2004 Nakashima et al.
6,700,851 B1 *  3/2004 Sanada et al. .......... 720/616

FOREIGN PATENT DOCUMENTS

JP    0974965 A1 *  1/2000

* cited by examiner

Primary Examiner—Allen Cao
(74) Attorney, Agent, or Firm—Sughrue Mion, PLLC

(57) ABSTRACT

A disk cartridge is provided which, with a small number of parts, can reduce manufacturing costs and facilitate assembly. In particular, the disk cartridge can be assembled easily even if a disk medium is small-sized. Case members of a same configuration are superposed together so as to form a case. Shutter members of a same configuration are disposed so as to correspond to openings of the case members. A lock member and a spring member are provided in common for the two shutter members. The case members of the same configuration and the shutter members of the same configuration are used, and only one lock member and only one spring member are provided. Thus, a number of parts can be reduced, manufacturing costs can be reduced, and assembly can be facilitated.

5 Claims, 21 Drawing Sheets

DISK CARTRIDGE

This is a divisional of application Ser. No. 10/223,439 filed Aug. 20, 2002, now U.S. Pat. No. 6,789,261; the disclosure of which is incorporated herein by reference.

BACKGROUND OF THE INVENTION

1. Field of the Invention

The present invention relates to a disk cartridge which accommodates, in the interior thereof, and protects a disk medium for recording of information.

2. Description of the Related Art

Conventionally, in 3.5-inch flexible disks (FDs), mini-disks (MDs) and the like, a disc-shaped disk medium is accommodated within a case. At the time of reading or recording information from or onto the disk medium, a recording member or a reading member of a drive device accesses the disk medium from an opening portion of the case. Further, a shutter member which opens and closes the opening portion is provided at the case. In the usual state, the shutter member is at a closed position and closes the opening portion. As needed, the shutter member is moved by (a shutter opening/closing mechanism of) the drive device to reach an open position, and the opening portion is opened.

At the case accommodating the disk medium, the two case members are combined such that an accommodating portion for a disk medium is formed therebetween. Because the two case members have respectively different configurations, the number of parts increases and the parts costs increase.

In order to prevent the opening portion from being opened needlessly, it is preferable to provide, at the case, a lock member for locking the shutter member, an urging member for urging the shutter member to the closed position, and the like. However, by providing such members, the number of parts increases, which leads to an increase in the costs for parts.

Moreover, because the number of work processes for assembling parts increases due to the increase in the number of parts, the assembly costs also increase. In addition, in recent years, it has become desirable to make disk media smaller sized. When, in accordance with this trend, the respective parts are also to be made small-sized, the assembly work becomes even more difficult.

The configuration of the cartridge case of the disk cartridge along the planar direction (the planar configuration) is substantially rectangular. On the other hand, the width of the opening of a disk cartridge loading portion of a disk drive device is slightly wider than the dimensions of the short sides of the cartridge case, and is narrower than the long sides of the cartridge case. In this way, when loading the disk cartridge into the drive device, it is possible to prevent the cartridge case from being inserted into the loading portion of the drive device in a state of being rotated 90° with respect to the correct direction of insertion, i.e., in the direction in which a long side of the cartridge case is inserted first.

However, when a user inserts the cartridge case into the loading portion of the drive device in a state of having rotated the cartridge case by 180° with respect to the correct direction of insertion, it is possible, from a dimensional standpoint, to insert the cartridge case into the loading portion of the drive device. Accordingly, in order to prevent such incorrect insertion of the disk cartridge, a detecting means must be provided at the drive device in order to detect a cartridge case which has been incorrectly inserted into the loading portion in a state of having been rotated by 180° with respect to the correct insertion direction. Such a means for detecting incorrect insertion may be, for example, a means which detects the insertion direction of the cartridge case by using an optical sensor or a magnetic sensor or the like. However, if such a means for detecting incorrect insertion is provided at the drive device, the structure of the drive device becomes complex, the number of parts increases and the cost of the device increases.

There are shutter opening/closing mechanisms of the above-described drive devices which, for example, open or close a shutter member by making a shutter opening/closing lever, which is formed in a pin-shape or a plate-shape, engage with the shutter member, and by moving the shutter opening/closing lever along the opening/closing direction of the shutter member.

In recent years, the development of small-sized disk cartridges and drive devices therefor has advanced as such small-sized disk cartridges and drive devices are utilized in mobile devices such as cellular phones and the like. As disk cartridges and drive devices have become more compact, of course, the shutter member at the disk cartridge and the shutter opening/closing lever at the drive device have also been made smaller. Such shutter members and shutter opening/closing levers have less relative dimensional accuracy and strength than shutter members and shutter opening/closing levers used in larger disk cartridges and drive devices. With such smaller structures, at the time of loading the disk cartridge into the drive device, it is difficult for the shutter opening/closing member to reliably be made to engage the shutter member.

Moreover, in a small-sized disk cartridge in which information can be recorded on and read out (played back from) both the obverse and reverse surfaces of the recording disk, usually, a window portion is formed in each of the obverse and reverse surfaces of the cartridge case, and a shutter member, for opening and closing the window portion, is disposed at each of the obverse side and the reverse side of the cartridge case. Accordingly, the configurations and dimensions of the shutter opening/closing lever and the shutter members are limited in order to, at the time of opening one shutter member by the shutter opening/closing lever, prevent the shutter opening/closing lever and the one shutter member from interfering with the other shutter member. When such limitations exist, it is extremely difficult to make the shutter opening/closing lever reliably engage with the shutter member when the disk cartridge is loaded into the drive device.

When a case, in which a disk medium is accommodated, is inserted into a drive device, the case is positioned within the drive device. Generally, a pair of reference holes for positioning are formed in the case along a direction orthogonal to the direction of insertion into the drive device, and positioning pins of the drive device can be fit into the reference holes.

Here, one reference hole is a completely circular portion, and the other reference hole is a flat oval portion. In this way, reference positioning of the case and the drive device is first carried out by the completely circular portion, and the flat oval portion absorbs the positional offset between the case and the drive device and the positional offset between the completely circular portion and the positioning pin when the case is tilted at the time of being loaded or discharged. In this way, galling between the positioning pin and the completely circular portion is mitigated.

When recording and playback are possible at both surfaces of the disk medium, there are cases in which the case is turned upside-down and inserted into the drive device. At such a time, the positions of the completely circular portion and the flat oval portion are reversed with respect to the positioning pins.

Thus, as shown in FIG. 18A, completely circular portions 500 and flat oval portions 502 are disposed so as to oppose one another. The completely circular portion 500 is disposed at a reference positioning pin 510 provided at a drive device (not shown), regardless of whether a case 504 (formed by a shell 506 and a shell 508) is upside-down or not.

However, as the case 504 is made to be ultra-compact, the case 504 is also made to be thinner. As shown in FIG. 18B, there are cases in which the distal end portions of the reference positioning pin 510 and a positioning pin 512 project from the shell 508 which is disposed at the lower side and reach the shell 506 disposed at the upper side.

In this case, the positional offset and the like between the completely circular portion 500 and the reference positioning pin 510 is absorbed at the positioning pin 512. Thus, regardless of the fact that the positioning pin 512 corresponds to the flat oval portion 502, the distal end portion of the positioning pin 512 fits together with the completely circular portion 500 of the shell 506, and there is the concern that problems will arise in the operations of loading and discharging the case 504.

Further, the case accommodating the disk medium is formed by fixing two shells (two case members) together by ultrasonic welding or the like.

A lock member which locks a shutter member in order to prevent inadvertent opening of the disk opening portion, an urging member which urges the shutter member toward its closed position, and the like are accommodated in the case. When the shells have been fixed together by ultrasonic welding, if the disk cartridge is deemed defective in a quality inspection, the parts thereof which could be used cannot be reused.

Thus, it is preferable to carry out ultrasonic welding after the disk cartridge has undergone a quality inspection. However, up until the time that the ultrasonic welding is carried out, the shells must be maintained in a temporarily fastened state so as to not come apart from one another.

SUMMARY OF THE INVENTION

In view of the aforementioned, an object of the present invention is to provide a disk cartridge which, by having a small number of parts, results in lower manufacturing costs and easy assembly, and in particular, to provide a disk cartridge which can be easily assembled even if a disk medium is small-sized.

Another object of the present invention is to provide a disk cartridge which enables easy recognition of the fact that the direction of insertion of a cartridge case, at the time of loading the disk cartridge into a disk drive device, is incorrect.

Still another object of the present invention is to provide a disk cartridge in which, at the time of loading the disk cartridge into a disk drive device, a shutter opening/closing member of the drive device can reliably engage with the one shutter member which is to be opened among the pair of shutter members which are provided correspondingly at the obverse and reverse surfaces of a recording disk.

Yet another object of the present invention is to provide a disk cartridge in which galling between a positioning pin and a reference hole does not arise at the time when a case is positioned in a drive device.

Still yet another object of the present invention is to provide a disk cartridge in which shells can be temporarily fastened together easily, the temporarily fastened state can be maintained, and the production loss can be reduced.

In a first aspect of the present invention, there is provided a disk cartridge comprising: a pair of case members having same configurations, and in a state in which the case members are superposed, the case members form a case in which a disk medium can be accommodated; opening portions provided in each of the case members, for access to the disk medium which is accommodated; a pair of shutter members provided at the pair of case members respectively, each shutter member movable, independently, between a closed position at which the shutter member closes a corresponding opening portion and an open position at which the shutter member opens the corresponding opening portion; a lock member provided for the shutter member, and able to lock the shutter member at the closed position; and an urging member provided for the shutter member, and able to urge the shutter member from the open position to the closed position, wherein at least one of the lock member and the urging member is provided in common for the pair of shutter members.

At the disk cartridge, the case is formed in the state in which the pair of case members are superposed together. The disk medium can be accommodated within the case.

An opening portion is formed in each of the case members. In the usual state, the shutter member is at the closed position. Further, the shutter member is locked at the closed position by the lock member. Thus, the opening portion is not inadvertently opened.

When locking of the shutter member by the lock member is released by the drive device or the like, the shutter member can move the open position. When, due to pressing of the shutter by the drive device or the like, the shutter member moves to the open position against the urging force of the urging member, the opening portion is opened. Thus, the drive device can access the disk medium, and can record or read information or the like. Note that a rotatable disk medium (i.e., a disk medium onto which information can be recorded or from which information can be read while the disk medium is being rotated) is usually used as the disk medium. In this case, for example, a spindle shaft or the like of the drive device is inserted in from the opening portion which has been opened, and can drive and rotate the disk medium.

An opening portion is provided at each of the case members. Thus, both surfaces of the disk medium can be accessed independently. The shutter members each independently move between the closed position and the open position. The lock member and the urging member as well lock and urge, respectively, each shutter member independently. Accordingly, at the time of opening or closing the opening portion of one case member, the opening portion of the other case member is not inadvertently opened or closed.

The case members forming the case have the same configuration. Thus, as compared with a case in which the case is structured by two or more case members having respectively different configurations, the number of parts can be reduced, and management of the number of parts is facilitated. For example, if the two case members are made to have symmetrical structures and one case member is inverted and superposed on the other case member, the case as well has a symmetrical structure. Thus, the disk cartridge can be used in an inverted state. Further, by making the case members have the same configuration, the case members can be manufactured by using a single molding device (e.g., a molding die), and management of precision is also facilitated.

In addition, the lock member and the urging member are provided in common for the shutter members. Namely, only one lock member and only one urging member are provided. Thus, as compared with a case in which a lock member and an urging member are provided for each shutter member, the number of parts can be reduced. The parts costs can thereby be reduced. Moreover, by reducing the number of parts, the assembly of the respective parts is also facilitated, and therefore, the assembly costs are also reduced.

In particular, even in cases in which the case members, the shutter members, the lock member and the urging member are made to be small-sized so as to correspond to a small-sized disk medium, these members can be assembled easily.

In a second aspect of the present invention, there is provided a disk cartridge accommodating a recording disk, as an information recording medium, within a cartridge case, and being inserted into a loading portion provided at a disk drive device, the disk cartridge comprising: a pair of shell members having same configurations, and being superposed together along a thickness direction of the recording disk so as to form the cartridge case; window portions formed in shell members so as to face an information recording surface at one side of the recording disk; shutter members provided at the shell members so as to be movable between a closed position, at which the shutter member closes the window portion, and an open position, at which the shutter member opens the window portion; guide grooves formed in the cartridge case at one side end surface corresponding to a direction of insertion of the cartridge case into the loading portion so as to extend, respectively, from both end portions of the one side end surface toward a center, and when the cartridge case is inserted into the loading portion so as to be oriented to a predetermined orientation (correct orientation), one portion of a shutter opening/closing member provided at the disk drive device is inserted into the guide groove and the guide groove guides the shutter opening/closing member to move along an opening/closing direction of the shutter member; and dummy grooves formed in the cartridge case at another side end surface at a side opposite to the one side end surface in which the guide grooves are formed, so as to extend, respectively, from both end portions of the other side end surface toward a center, and when the cartridge case is inserted into the loading portion so as to be oriented oppositely to the predetermined orientation (namely, wrong orientation), the one portion of the shutter opening/closing member is inserted into the dummy groove and the dummy groove guides the shutter opening/closing member to move along the opening/closing direction and restricts movement, to the open position, of the shutter opening/closing member.

In accordance with a disk cartridge of the second aspect of the present invention, dummy grooves are formed in the cartridge case at the other side end surface at the side opposite to the one side end surface in which the guide grooves are formed. Each dummy groove extends from an end portion of this other side end surface toward the center. In this way, when the cartridge case is inserted into the loading portion of the disk drive device so as to be oriented oppositely to the correct direction of insertion, a portion of the opening/closing member is inserted in the dummy groove, the shutter opening/closing member is guided by the dummy groove to move along the opening/closing direction of the shutter member, and movement of the shutter opening/closing member to the open position is restricted.

Accordingly, when the cartridge case is inserted into the loading portion of the disk drive device so as to be oriented oppositely, the shutter opening/closing member, which is in the midst of moving from the closed position to the open position, can no longer move. Thus, when it is detected that the shutter opening/closing member has stopped at the near side of the open position, it can be recognized that the cartridge case has been inserted into the loading portion of the disk drive device so as to be oriented oppositely to the correct direction. Further, it is possible to prevent the disk drive device and the disk cartridge from breaking due to one portion of the shutter opening/closing member colliding with the cartridge case or the like when the cartridge case is inserted into the loading portion of the disk drive device so as to be oriented oppositely.

Even if the disk cartridge is inserted into the loading portion of the disk drive device in the state in which the cartridge case is turned upside-down from the state at the time of the above-described insertion, the dummy grooves are formed in the cartridge case at the other side end surface at the side opposite to the one side end surface in which the guide grooves are formed, and extend from the both portions of this other side end surface toward the center. Thus, the shutter opening/closing member is reliably inserted into the dummy groove.

In accordance with a third aspect of the present invention, there is provided a disk cartridge accommodating a recording disk, as an information recording medium, within a cartridge case, and being removably loaded into a disk drive device, the disk cartridge comprising: a pair of shell members having same configurations, and being superposed together along a thickness direction of the recording disk so as to form the cartridge case; window portions formed respectively in the pair of shell members, each window portion facing a recording surface at one side of the recording disk; shutter members disposed at the pair of shell members, respectively, so as to be movable between a closed position, at which the shutter member closes the window portion, and an open position, at which the shutter member opens the window portion; shutter pushing portions, each projecting, in the thickness direction of the recording disk, from a shutter main body portion of the shutter member which moves in a region opposing the window portion, the shutter pushing portion being movable along a case front edge portion, which extends at the cartridge case substantially parallel to an opening/closing direction of the shutter members, while opposing the case front edge portion; and guide grooves provided in the case front edge portion so as to extend, respectively, from both widthwise direction end portions toward a central portion, and when the disk cartridge is loaded into the disk drive device, a shutter opening/closing member provided at the disk drive device enters into the guide groove and the guide groove guides the shutter opening/closing member to engage with the shutter pushing portion which corresponds to one recording surface of the recording disk at which recording surface information is to be recorded onto or played back from.

Accordingly, in accordance with the disk cartridge relating to the third aspect, even if the projecting length, by which the shutter pushing portion projects along the thickness direction of the recording disk from the shutter main body portion, cannot be made to be sufficiently long, if the groove width of the guide groove along the thickness direction is longer than the projecting length of the shutter pushing portion, the allowable range of the positional error, along the direction of thickness of the recording disk, of the shutter opening/closing member can be increased by an amount corresponding to the difference between the groove width of the guide groove and the projecting length of the shutter pushing portion. Thus, by setting the groove width of the guide groove in accordance with the actual positional error, along the thickness direction, of the shutter opening/closing member, the shutter opening/closing member can be guided so as to engage with the shutter pushing portion corresponding to the recording surface at the one side of the recording disk, at which recording surface information is to be recorded on or played back from.

In accordance with a fourth aspect of the present invention, there is provided a disk cartridge comprising: a case accommodating a disk medium whose both surfaces can be utilized by the case being inverted; (completely) circular reference holes (small diameter (size) holes) provided at both surfaces of the case, and due to the case being inverted, a positioning pin of a drive device is inserted into the circular reference hole and the circular reference hole carries out positioning of the case; and flat oval reference holes (large diameter (size) holes) provided at the both surfaces of the case, and due to the case being inverted, a positioning pin of the drive device is inserted into the flat oval reference hole and the flat oval reference hole, together with the circular reference hole, carries out positioning of the case, wherein a space is provided between the completely circular reference hole, which is formed from one surface of the case, and the flat oval reference hole, which is formed from another surface of the case and communicates with the completely circular reference hole, such that a distal end portion of the positioning pin does not interfere with the space when the case is positioned within the drive device.

In the fourth aspect of the present invention, a disk medium, whose both surfaces can be used by inverting a case, is accommodated within the case. A completely circular reference hole and a flat oval reference hole are provided in both surfaces of the case. By inverting the case, positioning pins of a drive device are inserted into the completely circular reference hole and the flat oval reference hole, and the case is positioned.

Here, positioning of the case is carried out by the completely circular reference hole and the flat oval reference hole. Positional offset between the completely circular reference hole and the positioning pin can be absorbed by making one of the reference holes be a flat oval reference hole. Thus, galling between the positioning pin and the completely circular reference hole can be mitigated.

The completely circular reference hole formed from one surface of the case and the flat oval reference hole formed from the other surface of the case communicate with one another. A space is provided between the completely circular reference hole and the flat oval reference hole, such that the distal end portion of the positioning pin does not interfere when the case is positioned within the drive device.

For example, in a case in which a space, which is such that the distal end portion of the positioning pin does not interfere when the case is positioned within the drive device, is not provided between the completely circular reference hole and the flat oval reference hole, there is the fear that the distal end portion of the positioning pin will pass through the flat oval reference hole formed from the other surface of the case and will fit-together with the completely circular reference hole.

By providing, between the completely circular reference hole and the flat oval reference hole, a space which is such that the distal end portion of the positioning pin does not interfere when the case is positioned within the drive device, even if the distal end portion of the positioning pin passes through the flat oval reference hole which is formed from the other surface of the case, due to the space which provided between the completely circular reference hole and the flat oval reference hole, the distal end portion of the positioning pin does not fit-together with the completely circular reference hole, and no galling arises between the distal end portion of the positioning pin and the completely circular reference hole.

An example of a method of providing a space, which is such that the distal end portion of the positioning pin does not interfere, between the completely circular reference hole and the flat oval reference hole, is a method in which the inner surface side of the case is made concave such that the peripheral portions of the completely circular reference hole and the flat oval reference hole are made to be thin. In this way, in the state in which the completely circular reference hole and the flat oval reference hole communicate with one another, a space is formed between the peripheral portion of the completely circular reference hole and the peripheral portion of the flat oval reference hole.

The depth of the space along the axial direction of the positioning pin (i.e., the distance by which the peripheral portion of the completely circular reference hole and the peripheral portion of the flat oval reference hole are separated from one another) is a depth such that the distal end portion of the positioning pin can be accommodated within the space when the case is positioned within the drive device. In this way, the distal end portion of the positioning pin does not pass through the flat oval reference hole formed from the other surface of the case, and does not interfere with the completely circular reference hole.

Other than the above-described method, an elongated hole, which communicates with the completely circular reference hole, may be provided in the inner surface side of the case. The depth of this elongated hole is a depth such that the distal end portion of the positioning pin can be accommodated within the elongated hole when the case is positioned within the drive device. In this way, even if the distal end portion of the positioning pin passes through the flat oval reference hole formed from the other surface of the case, it is positioned within the elongated hole. Thus, the distal end portion of the positioning pin does not reach the completely circular reference hole. Therefore, the distal end portion of the positioning pin does not fit-together with the completely circular reference hole.

In accordance with a fifth aspect of the present invention, there is provided a disk cartridge comprising: a pair of shells having same configurations, and in a state in which inner surface sides of the pair of shells are superposed, a disk medium is accommodated at an interior, and convex portions and concave portions, which can fit-together, are disposed at the pair of shells so as to oppose one another.

In the fifth aspect of the present invention, in a state in which inner surface sides of a pair of shells, which have the same configurations, are superposed, a disk medium is accommodated in the interior. Further, convex portions and concave portions, which can fit-together with one another in the state in which the inner surface sides of the shells are superposed, are disposed so as to oppose one another.

By fitting-together the convex portions and the concave portions which oppose one another, the pair of shells can be temporarily fastened. Thus, this temporarily fastened state can be maintained such that the shells do not separate from one another, up until the time that ultrasonic welding is carried out. Further, in the state in which the convex portions and the concave portions are fit-together, by making an adhesive or the like flow in so as to fix the shells, the two shells can be made integral in a state in which the positions of the shells are regulated. Thus, a highly-precise disk cartridge can be obtained.

The temporarily fastened state can be maintained in the state in which the convex portions and concave portions are fit-together. Thus, it is possible to, after various quality inspections have been carried out on the assembled (but not fixed) disk cartridge, ultimately fix only those disk cartridges which have passed inspection. If there is a disk cartridge which has not passed inspection, the disk cartridge can be disassembled merely by canceling the fit-together state of the convex portions and the concave portions. Thus, those parts which can be reused can be utilized again, and the production loss can be reduced.

The shells can be fixed together by making the concave portions be through-holes, and by melting and deforming the distal end portions of the convex portions exposed at the outer surface side of the shell. In this way, the shells can be fixed together, not just by adhesion, but by ultrasonic welding as well. Further, in this case, it suffices to deform only the distal end portions of the convex portions. Thus, it is possible to use less vibration energy which is applied by the ultrasonic welding, the generation of dust can be suppressed, and there are few effects on the disk cartridge.

The through hole can be made to be a stepped structure formed by a fit-together portion, which is provided at the inner surface side of the shell and which fits-together with the convex portion, and a large diameter portion, which is provided at the outer surface side of the shell and whose diameter is larger than that of the fit-together portion. In this way, the deformed distal end portion of the convex portion is accommodated in the large diameter portion. Therefore, the convex portion is prevented from being pulled out, and the fixing strength can be ensured. Moreover, the distal end portion of the convex portion which has been melted does not project out from the outer surface side of the shell. Here, providing a taper, whose diameter increases from the inner surface side of the shell toward the outer surface side, at the large diameter portion is even more effective.

By fixing the shells together, there is the fear that, due to the vibration energy applied due to the ultrasonic welding, excessive stress will be applied to the base portion of the convex portion, and the base portion may break or the like. However, by providing an R portion or a C surface portion at the base end side of the convex portion, the convex portion is reinforced and is made difficult to break.

In accordance with a sixth aspect of the present invention according to the first aspect, the lock member is provided in common for the pair of the shutter members, and able to lock each of the shutter members independently at the closed position; and the urging member is provided in common for the pair of shutter members, and able to urge each of the shutter members independently from the open position to the closed position.

In accordance with a seventh aspect of the present invention according to the first aspect, the lock member has rotation symmetry configuration with respect to a symmetry axis of the disk cartridge, which is parallel to an inserting direction of the disk cartridge.

In accordance with an eighth aspect of the present invention according to the first aspect, the urging member has rotation symmetry configuration with respect to a symmetry axis of the disk cartridge, which is parallel to an inserting direction of the disk cartridge.

In accordance with a ninth aspect of the present invention according to the second aspect, the dummy groove includes a stopper, and the dummy groove restricts the movement, to the open position, of the shutter opening/closing member by the shutter opening/closing member being abutted to the stopper.

In accordance with a tenth aspect of the present invention according to the ninth aspect, a pressed portion, which is pressed by the shutter opening/closing member, is provided in the shutter member, and the stopper is positioned, in a cartridge case-widthwise direction orthogonal to an inserting direction of the cartridge case, outside the pressed portion of the shutter member positioned in the open position.

In accordance with an eleventh aspect of the present invention according to the third aspect, the guide groove is formed such that a width in the thickness direction at an outside end portion, in the widthwise direction, of the guide groove is larger than that at a center side end portion of the guide groove.

In accordance with a twelfth aspect of the present invention according to the third aspect, a length, in the thickness direction, of a portion of the shutter pushing portion is smaller than a width, in the thickness direction, of a groove formed in the case front edge portion, the portion of the shutter pushing portion facing the groove.

In accordance with a thirteenth aspect of the present invention according to the third aspect, an outside end portion, in the widthwise direction, of the shutter pushing portion is inclined with respect to the thickness direction.

In accordance with a fourteenth aspect of the present invention according to the fourth aspect, the flat oval reference hole includes the space, and a dimension, in a thickness direction of the disk medium, of the flat oval reference hole is set such that a tip end of the positioning pin is accommodated within the flat oval reference hole when insertion of the positioning pin.

In accordance with a fifteenth aspect of the present invention according to the fourth aspect, a dimension, in a thickness direction of the disk medium, of the space is set such that a tip end of the positioning pin is accommodated within the space when insertion of the positioning pin.

In accordance with a sixteenth aspect of the present invention according to the fifth aspect, the concave portion is a penetration hole and the convex portion is inserted into the penetration hole.

In accordance with a seventeenth aspect of the present invention according to the sixteenth aspect, the penetration hole comprises a small dimension portion for engaging the convex portion and a large diameter portion larger than the small dimension portion.

BRIEF DESCRIPTION OF THE DRAWINGS

FIG. 16A shows a state in which positioning pins are not inserted, and FIG. 16B shows a state in which the positioning pins are inserted.

FIG. 17A shows a state in which the positioning pins are not inserted, and FIG. 17B shows a state in which the positioning pins are inserted.

FIG. 18A shows a state in which the positioning pins are not inserted, and FIG. 18B shows a state in which the positioning pins are inserted.

FIG. 21A shows a state in which the shells are temporarily fastened together, and FIG. 21B shows a state in which the shells are fixed together.

DESCRIPTION OF THE PREFERRED EMBODIMENTS

Figure 1:
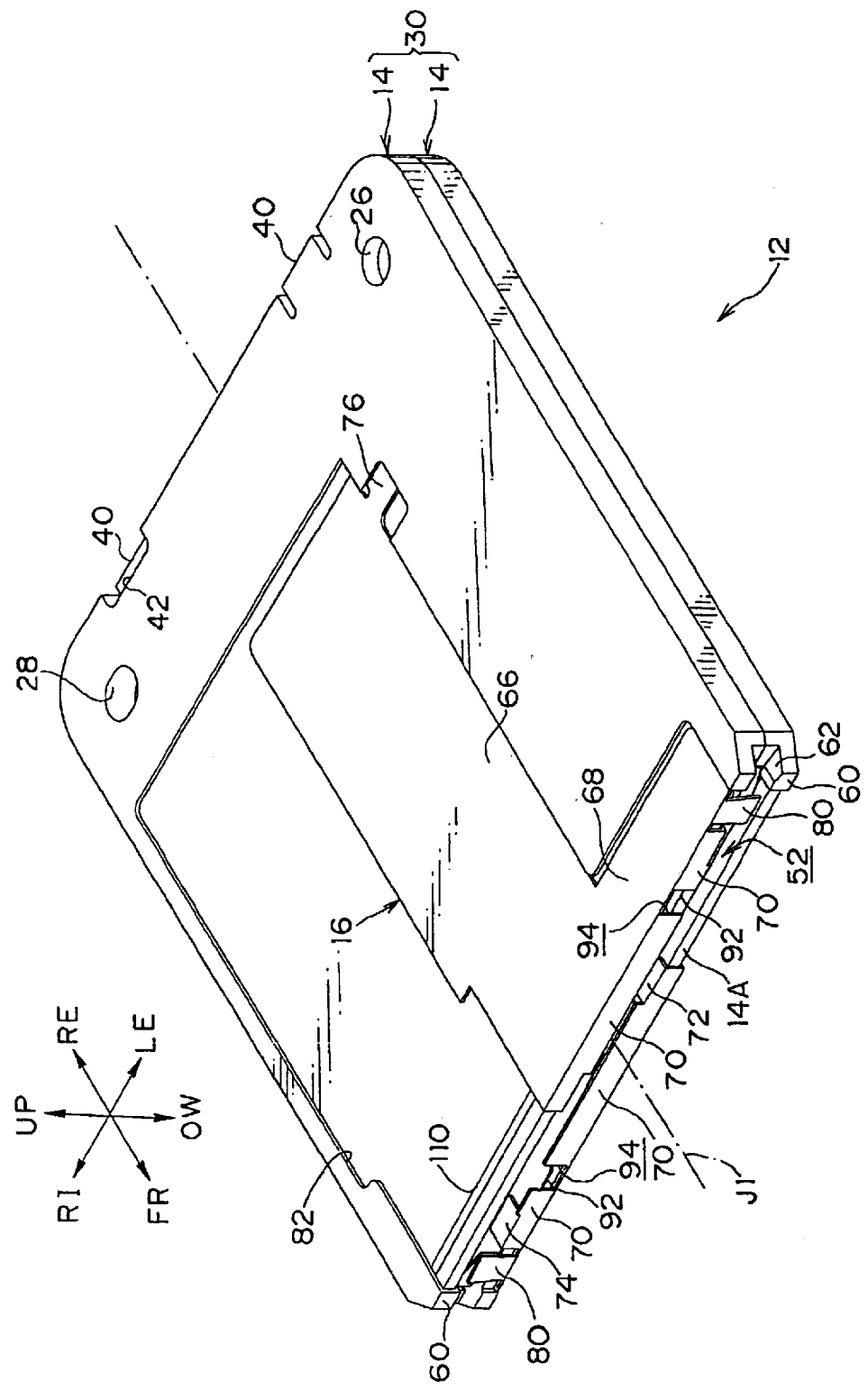
FIG. 1 is a perspective view showing a disk cartridge of embodiments of the present invention.

A disk cartridge 12 of a first embodiment of the present invention will be described hereinafter on the basis of FIGS. 1 through 9. Note that, in the drawings, when arrows FR, RE, UP, DW, RI and LE are used, they indicate, respectively, the front direction (the loading direction), the rear direction, the upward direction, the downward direction, the rightward direction, and the leftward direction of the disk cartridge 12 while looking in the direction of loading (inserting) the disk cartridge 12 into a drive device. Hereinafter, when the top, bottom, front, rear, left and right are indicated, they correspond to the directions of these respective arrows. Further, the "longitudinal direction", "thickness direction" and "widthwise direction" of the disk cartridge 12 are, respectively, the front-back (back-front) direction, the up-down (down-up) (vertical) direction, and the left-right (right-left) direction. These respective directions are for convenience of explanation, and are not intended to limit the directions at the time of using the disk cartridge 12. Accordingly, for example, the disk cartridge 12 may be disposed horizontally or may be disposed vertically at the time of use thereof.

Figure 2:
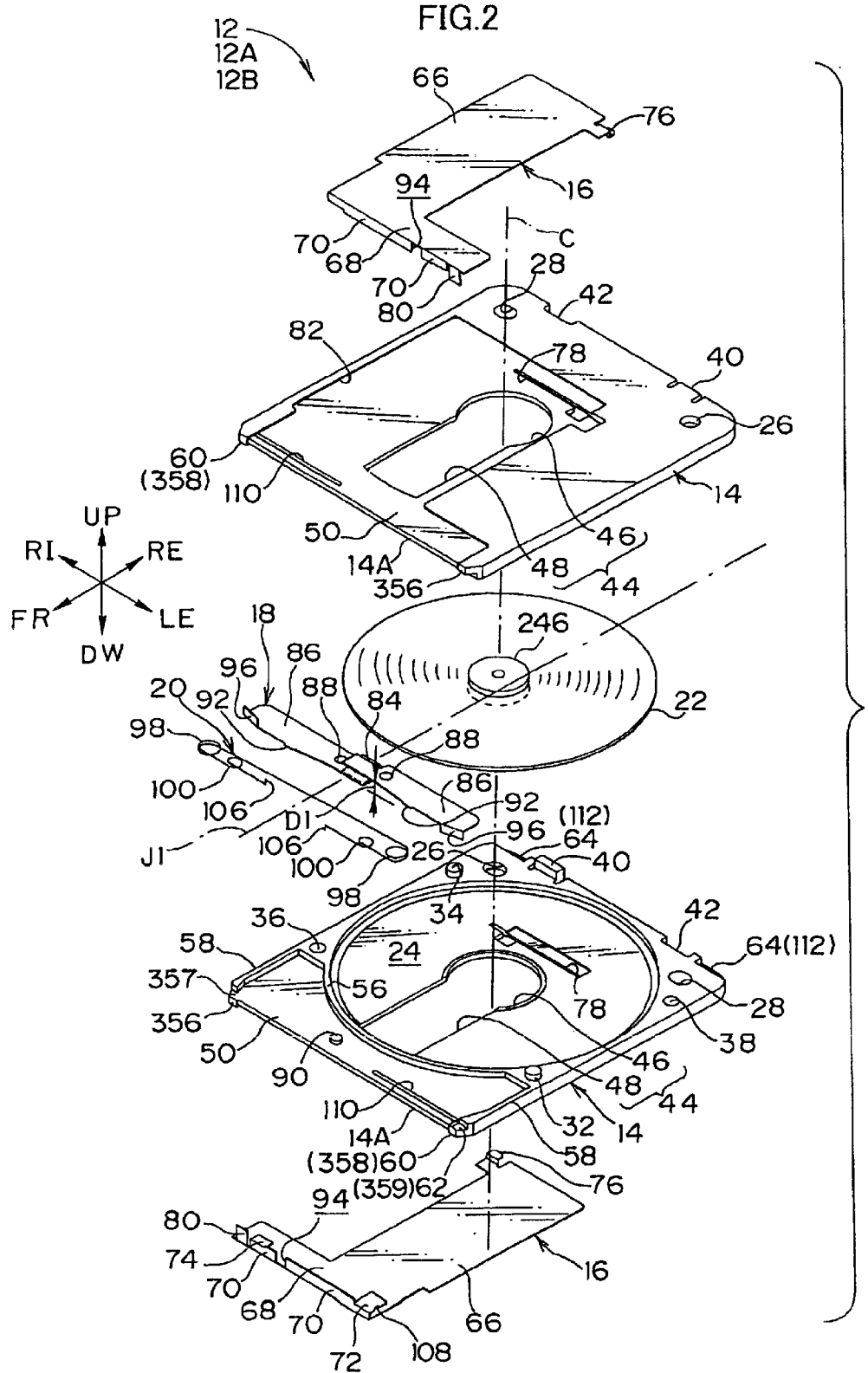
FIG. 2 is an exploded perspective view showing a disk medium and the disk cartridge of the embodiments of the present invention.

As shown in FIG. 2, the disk cartridge 12 has two case members 14, two shutter members 16 provided so as to correspond to the case members 14 respectively, and one lock member 18 and one spring member 20 which are provided in common for the two shutter members 16.

The two (the pair of) case members (shell members) 14 have the same configuration, and as seen in plan view, are each formed as a substantially rectangular plate shape. The front-back dimension of the case member 14 is greater than the left-right dimension thereof, such that the disk cartridge 12 cannot be incorrectly inserted into a drive device (not shown) in the widthwise direction (the left-right direction) thereof.

A circular hole 26 and an elongated hole 28 for positioning are formed in predetermined positions of the case member 14. Within the drive device, the case member 14, i.e., the disk cartridge 12, is positioned by reference pins (not shown) of the drive device being inserted into the circular hole 26 and the elongated hole 28.

A medium accommodating portion 24, which corresponds to a disc-shaped disk medium 22, is formed in the case member 14 at a position offset slightly toward the rear from the substantial center of the case member 14. A case 30 (see FIG. 1), which relates to the disk cartridge 12 of the present invention, is formed by superposing one case member 14 on the other case member 14 in a state in which one case member 14 is rotated (inverted) around an axis of symmetry J1 with respect to the other case member 14, such that the two medium accommodating portions 24 oppose one another. The disk medium 22 can be held within the medium accommodating portions 24. Hereinafter, the surface at which the medium accommodating portion 24 is formed will be called the inner surface of the case member 14, and the surface at the opposite side will be called the outer surface of the case member 14.

Two bosses 32, 34 stand erect at the inner surface of the case member 14. Fit-together holes 36, 38, which correspond to the bosses 32, 24, are formed at positions which are symmetrical with respect to the axis of symmetry J1. When the corresponding bosses 32, 34 are fit together with the fit-together holes 36, 38 in the state in which the two case members 14 are superposed, the superposed state of the case members 14 is maintained, and the case members 14 cannot be inadvertently separated from one another.

A tab 40, which can be broken off, is provided erect at the rear side of the case member 14 at one side in the widthwise direction (the right side in the present embodiment) as seen from the inner surface side. On the other hand, a tab accommodating portion 42, in which the tab 40 is accommodated in the state in which the case members 14 are superposed together, is formed at the other side in the widthwise direction (the left side in the present embodiment) as seen from the inner surface side. Accordingly, in the state in which the case 30 is formed, the two tabs 40 are provided symmetrically with respect to the axis of symmetry J1. By breaking off one or both of these tabs 40, it is possible to recognize a surface of the disk cartridge (to recognize that either of the surfaces is the A surface), or to recognize some other information. This information can be read visually, but can also, for example, be read by a reading device or the like within the drive device.

An opening 44 is formed in the case member 14. The opening 44 is formed by an opening portion 46 for rotating/driving and an opening portion 48 for reading/writing. The opening portion 46 for rotating/driving is concentric with the accommodated disk medium 22 (the center is shown by central axis C) and has a smaller diameter than the disk medium 22. The opening portion 48 for reading/writing is continuous with the opening portion 46 for rotating/driving and is a substantial rectangle which is formed toward the front. The front end of the opening portion 48 for reading/writing is curved in a circular-arc-shape. In the state in which the disk cartridge 12 is loaded in a drive device, a rotating/driving member of the drive device (e.g., a rotating spindle shaft) accesses the disk medium 22 from the opening portion 46 for rotating/driving, and can rotate the disk medium 22. Further, a reading/writing member of the drive device (e.g., a recording/playback head) accesses the disk medium 22 from the opening portion 48 for reading/writing, and can carry out reading of information from or writing of information onto the disk medium 22.

Figure 3:
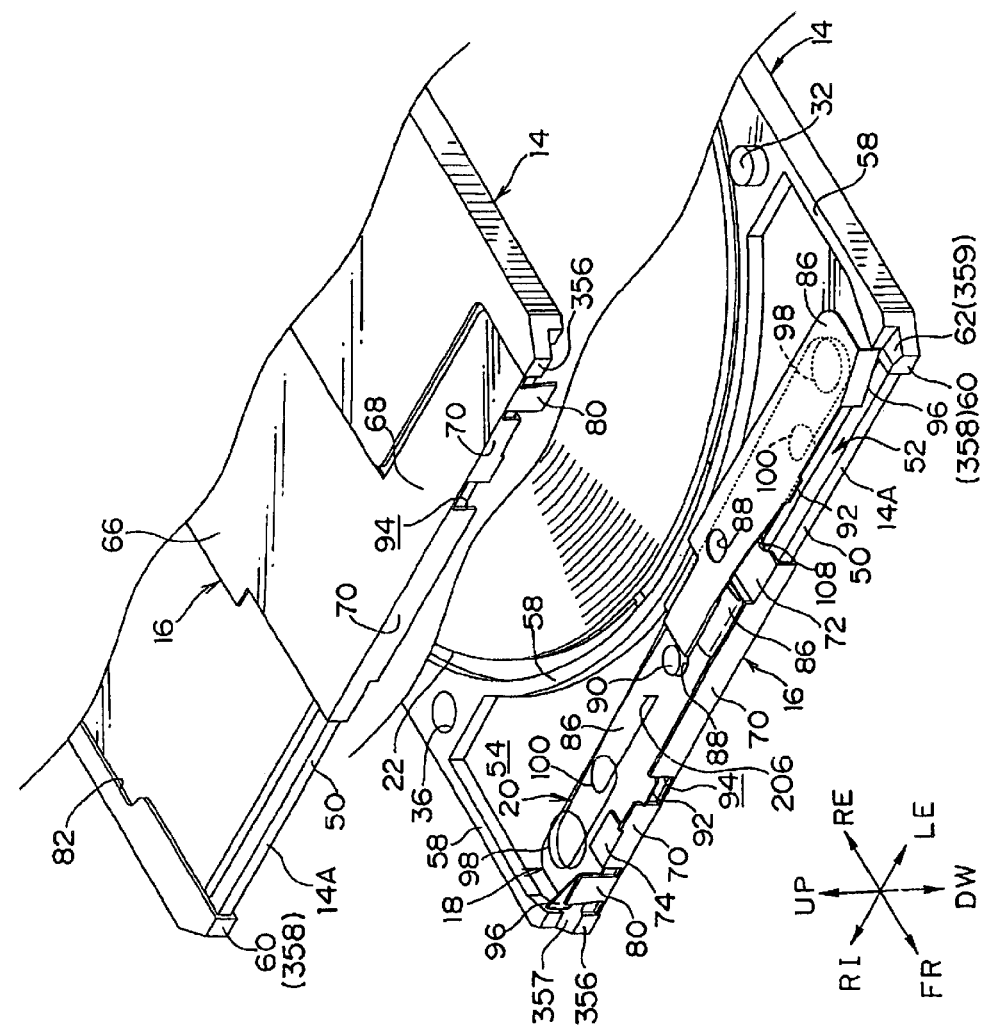
FIG. 3 is a perspective view showing, in an enlarged manner, a vicinity of a front portion of the disk cartridge of the embodiments of the present invention.

A thin portion 50, which is locally thin from the inner surface side toward the outer surface side, is formed at the front edge portion of the case member 14. As shown in FIG. 3, when the two case members 14 are superposed so as to form the case 30, an entry groove 52 and a spring accommodating/deforming region 54 are formed by the thin portions 50. As shown in FIG. 1, the entry groove 52 is formed along the entire widthwise direction at the front edge portion of the disk cartridge 12. When a shutter opening/closing pin 112 (see FIGS. 5 through 9) of the drive device is slid, the distal end thereof enters into the entry groove 52 from the widthwise direction outer side of the disk cartridge 12. The spring accommodating/deforming region 54 is continuous with the entry groove 52. The widthwise direction center of the spring accommodating/deforming region 54 is shaped so as to bend along the medium accommodating portion 24. A spring member 20 (formed from a metal wire) is accommodated in the spring accommodating/deforming region 54. Note that a separating wall 56 is formed between the spring accommodating/deforming region 54 and the medium accommodating portion 24 by maintaining the thickness of the case member 14 and not making the case member 14 thin. The separating wall 56 prevents the disk medium 22 and the spring member 20 from contacting one another. Further, side walls 58 are formed at the both widthwise direction end portions of the spring accommodating/deforming region 54 by maintaining the thickness of the case member 14 and not making the case member 14 thin. The sidewalls 58 prevent the spring member 20 from falling out, and limit the range of deformation thereof as will be described later.

A convex portion 60, which projects from the thin portion 50, is formed at the left end portion of the entry groove 52 as seen from the inner surface side of the case member 14. As can be understood from FIG. 1, the entrance portion of the entry groove 52 is substantially narrowed by the convex portion 60. A taper surface 62 is formed at the distal end surface of the convex portion 60. The taper surface 62 approaches the opposing thin portion 50 from the widthwise direction end portion of the disk cartridge 12 toward the widthwise direction center thereof. Accordingly, in the initial stages of entry of the shutter opening/closing pin 112 into the entry groove 52, the shutter opening/closing pin 112 is guided along the taper surface 62. The shutter opening/closing pin 112 reliably pushes a pushed piece 96 of the lock member 18 and a pressed rib 80 of the shutter member 16 which will be described later.

Thin portions 64 are formed at portions of the rear side of the case member 14, further toward the widthwise direction outer sides than the tab 40 and the tab accommodating portion 42. When the case 30 is formed, restricting grooves are formed by the thin portions 64 in vicinities of the widthwise direction end portions. When, in the state in which the disk cartridge 12 is incorrectly inserted in a rearward direction into the drive device, the shutter opening/closing pin 112 moves into the restricting groove, the movement of the shutter opening/closing pin 112 is restricted by the shutter opening/closing pin 112 abutting the deep wall of the restricting groove (i.e., the end portion at the tab 40 side or the end portion at the tab accommodating portion 42 side). In this way, the drive device can recognize that the disk cartridge 12 is incorrectly inserted in the rearward direction.

The pair of shutter members 16 are disposed at the outer surfaces of the respective case members 14. The shutter member 16 is formed in a substantial L-shape having a shutter main body portion 66 of a size which can close at least the opening 44, and a shutter guide portion 68 which extends from the front side of the shutter main body portion 66. Contact pieces 70, which rise at a substantially right angle, stand erect at the shutter guide portion 68. Two guide pieces 72, 74 are formed parallel to the shutter guide portion 68, at end portions of the contact pieces 70. When the shutter member 16 is disposed at a predetermined position of the case member 14, the contact pieces 70 contact a front edge 14A of the case member 14, and the guide pieces 72, 74 oppose the case member 14 at the opposite side of the shutter guide portion 68. In this way, the shutter member 16 can be prevented from inadvertently falling off or joggling.

Figure 5:
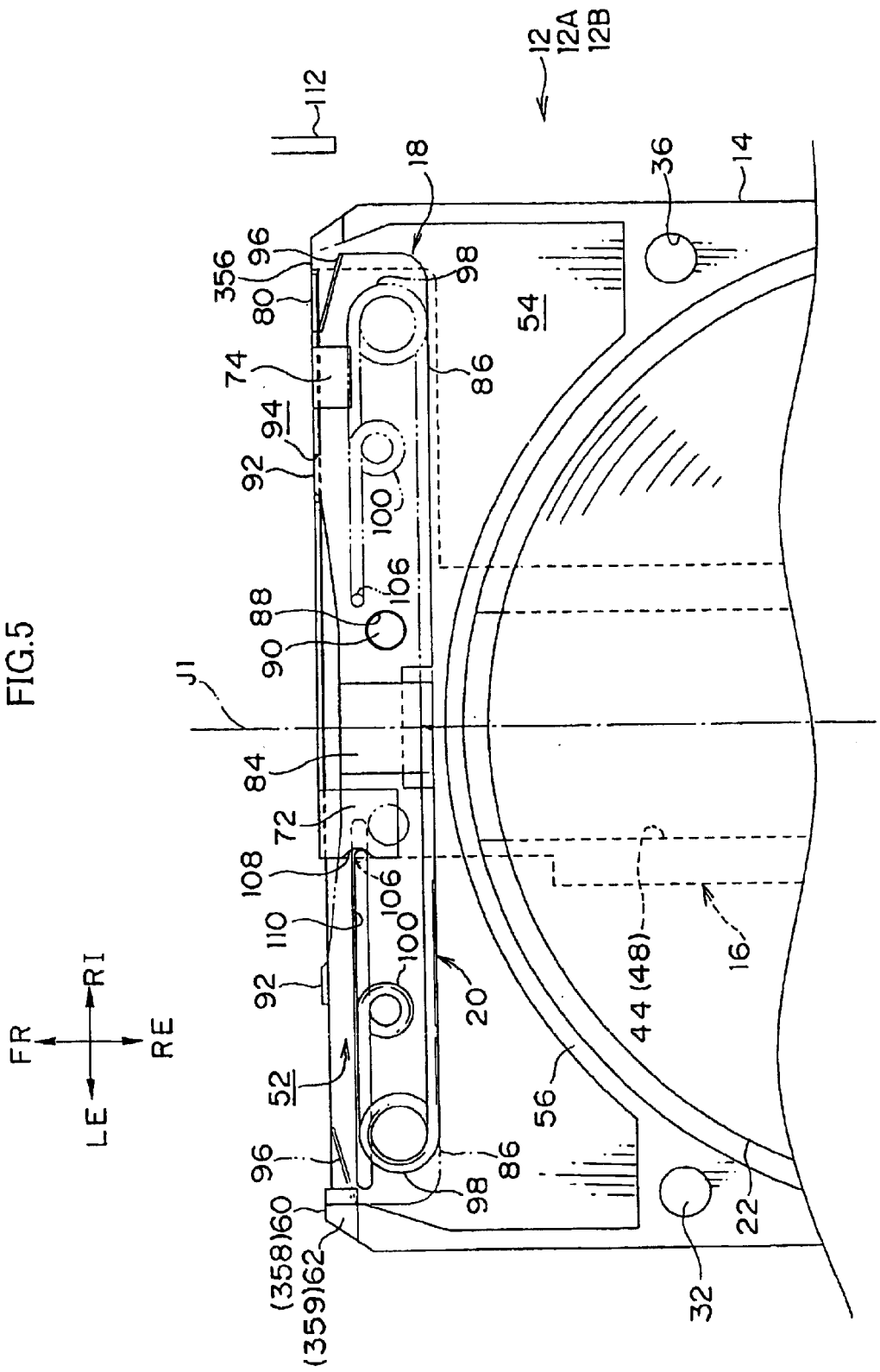
FIG. 5 is a diagram for explanation showing a state at a time when a shutter member is at a closed position in the disk cartridge of the embodiments of the present invention.
Figure 9:
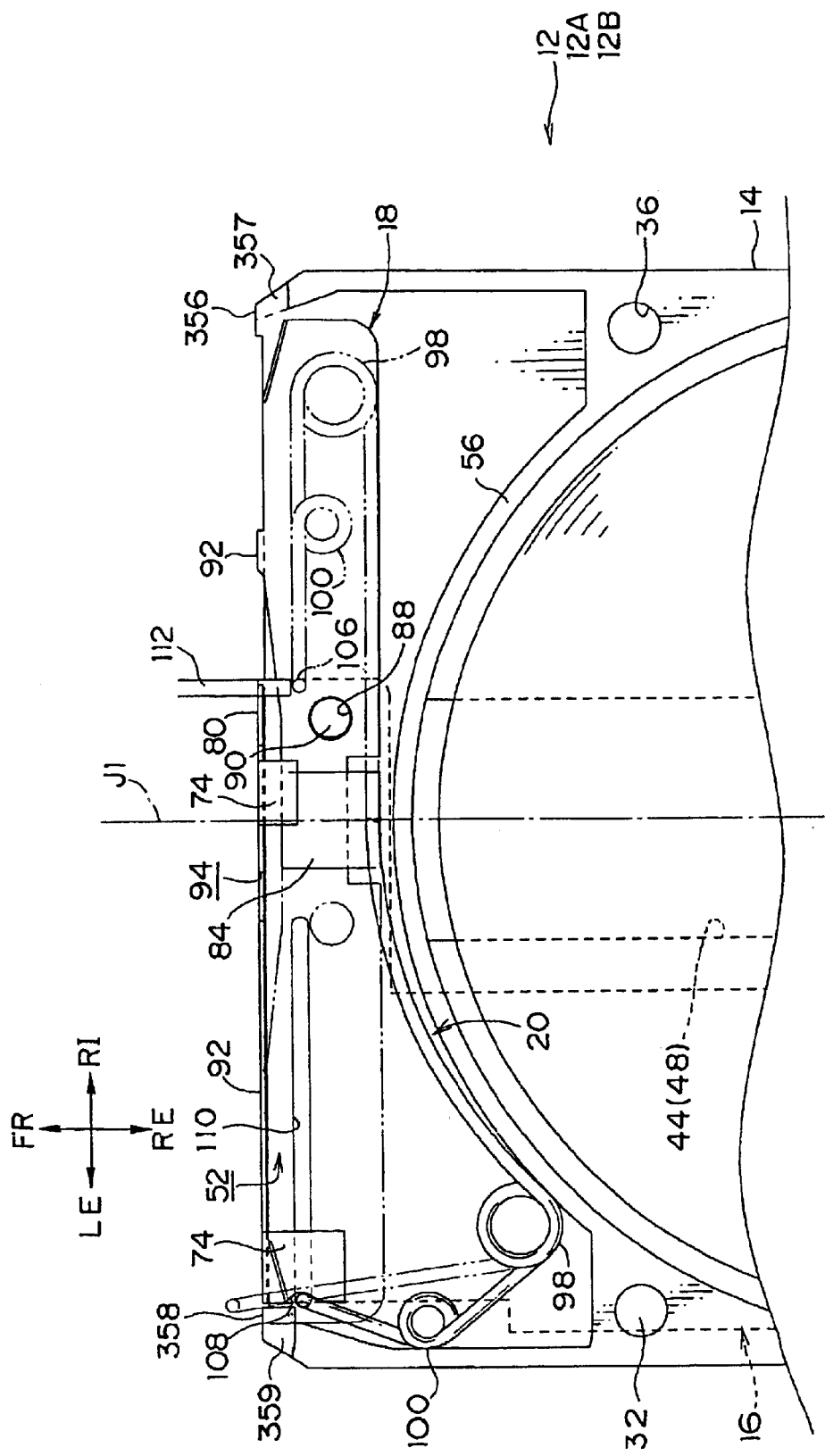
FIG. 9 is a diagram for explanation showing a state at a time when the shutter member is at the open position in the disk cartridge of the embodiments of the present invention.

A guide piece 76 is formed at a vicinity of the rear end of the shutter main body portion 66. The guide piece 76 extends in the same direction as the shutter guide portion 68, and rises up at a right angle with respect to the shutter main body portion 66. The distal end of the guide piece 76 is bent parallel to the shutter main body portion 66. A guide hole 78, which passes through the shutter member 16 in the thickness direction thereof, is formed in the shutter member 16 along the left-right direction. The guide piece 76 is inserted into the guide hole 78 (see FIG. 1). In this way as well, the shutter member 16 can be prevented from inadvertently falling off from or joggling at the case member 14. The shutter member 16 slides, without joggling, while being guided by the guide pieces 72, 74, 76 from the position at which the shutter main body portion 66 of the shutter member 16 closes the opening 44 of the case member 14 (a closed position) as shown in FIG. 5, to the position at which the opening 44 is open (an open position) as shown in FIG. 9. Note that a concave portion 82, which corresponds to the region of movement of the shutter member 16, is formed in the outer surface of the case member 14, such that the shutter member 16 does not project from the case member 14 in the thickness direction (either upwardly or downwardly).

The pressed rib 80 stands erect at a vicinity of the distal end of the shutter guide portion 68 of the shutter member 16, so as to be positioned in the same plane as the contact pieces 70. The projected length of the pressed rib 80 (the vertical direction length as measured along the direction of thickness of the shutter guide portion 68) is longer than the projected length of the contact pieces 70. A vicinity of the projecting end of the pressed rib 80 is positioned within the entry groove 52. Further, the pressed rib 80 is supported so as to directly oppose the entry groove 52. Accordingly, when the shutter opening/closing pin 112 moves in the entry groove 52, the shutter opening/closing pin 112 contacts the pressed rib 80. Due to the shutter opening/closing pin 112 moving further, the shutter member 16 is pushed toward the open position (see FIGS. 6 through 9).

As shown in FIGS. 2 and 3, the lock member 18, which is formed by processing (folding or the like) a plate member at a predetermined position, is disposed between the two case members 14. The lock member 18 is formed to include a spring portion 84 and rotating portions 86. The spring portion 84 is formed by bending a metal plate at the left-right direction center thereof into a multi-layer configuration. The rotating portions 86 extend toward the left and the right from the top end and the bottom end of the spring portion 84. The lock member 18 is formed in a configuration having substantially line symmetry (symmetry by rotation), when viewed along the axis of symmetry J1. Accordingly, when the lock member 18 is rotated around the axis of symmetry J1, the lock member 18 after rotation and the lock member 18 before rotation coincide completely.

A pivot hole 88 is formed in the rotating portion 86 in a vicinity of the spring portion 84. A pivot pin 90, which stands erect from the inner surface (the thin portion 50) of the case member 14, is inserted in the pivot hole 88. The rotating portions 86 rotate independently around the pivot pins 90, and accompanying the rotation, the spring portion 84 deforms. Thus, the spring portion 84 applies elastic force, in directions opposite to the rotating directions, to the rotating portions 86.

Figure 6:
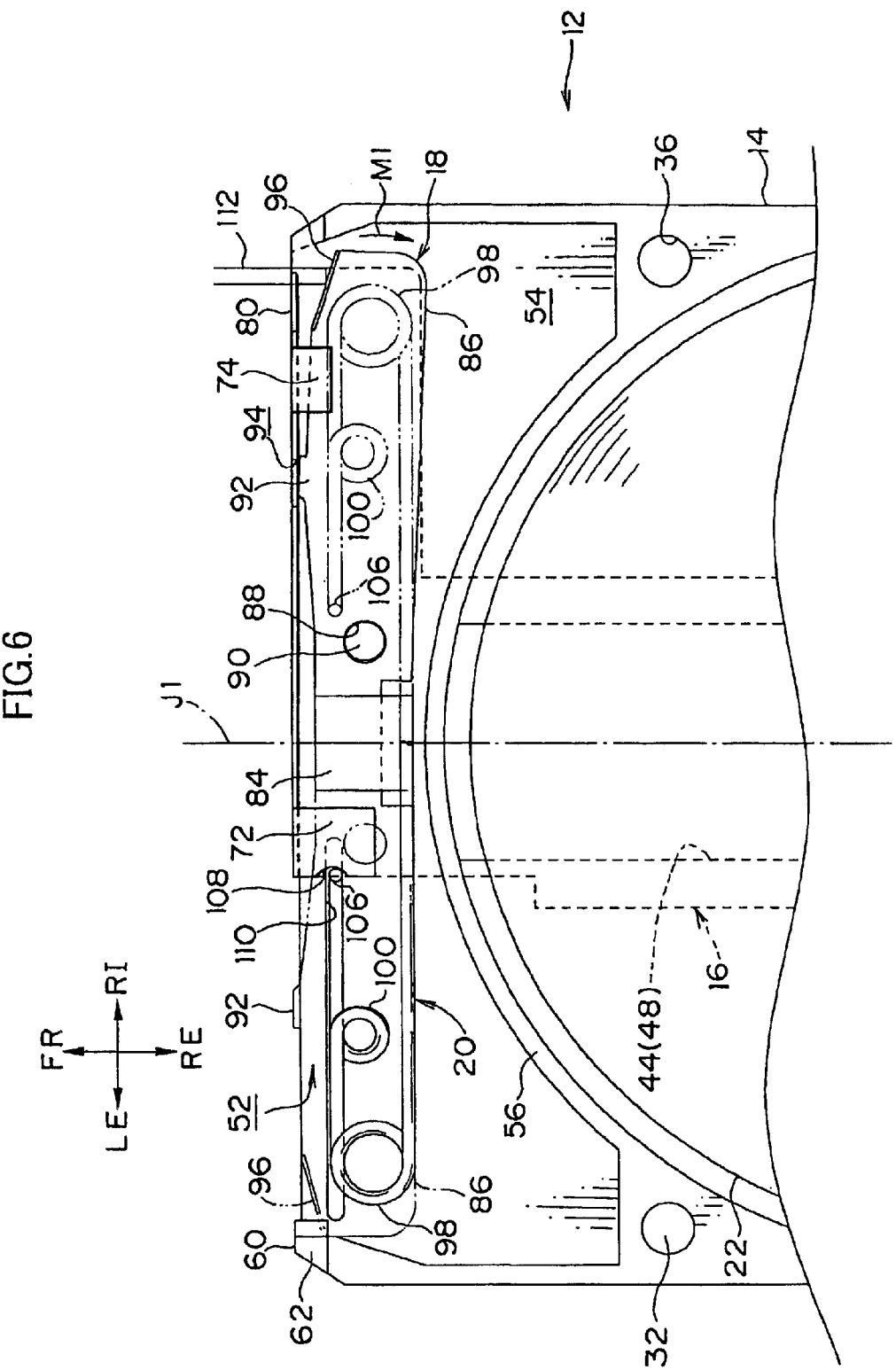
FIG. 6 is a diagram for explanation showing a state in which locking of the shutter member is released in the disk cartridge of the embodiments of the present invention.

A locking convex portion 92, which projects toward the front, is formed at the longitudinal direction center of the rotating portion 86. On the other hand, at the shutter member 16, the contact pieces 70 are partially cut-out such that a locking concave portion 94 is formed. As shown in FIG. 5, when the shutter member 16 is positioned at the closed position, the locking convex portion 92 engages with the locking concave portion 94. Therefore, movement of the shutter member 16 is restricted, and the shutter member 16 is locked at the closed position. In contrast, as shown in FIG. 6, when the rotating portion 86 rotates in the lock releasing direction (the direction of arrow M1) around the pivot pin 90 and the engagement of the locking convex portion 92 with the locking concave portion 94 is cancelled, the locking of the shutter member 16 is also cancelled, and the shutter member 16 can move toward the open position. The rotating portions 86 rotate independently of one another. Thus, when one of the rotating portions 86 rotates in the lock releasing direction, the other rotating portion 86 does not rotate in the lock releasing direction, and the engaged state of the locking convex portion 92, which corresponds to this other rotating portion 86, with the locking concave portion 94 is maintained.

The pushed piece 96 is formed at the distal end of the rotating portion 86. Within the entry groove 52, the pushed piece 96 projects further toward the widthwise direction outer side than the pushed rib 80 of the shutter member 16. The pushed piece 96 is formed in a taper shape which, from the widthwise direction outer side of the disk cartridge 12 toward the widthwise direction central side, gradually inclines toward the front. As shown in FIG. 6, when the shutter opening/closing pin 112, which has moved into the entry groove 52, contacts the pushed piece 96 and moves further toward the widthwise direction center of the disk cartridge 12, the pushed piece 96 is pushed by the shutter opening/closing pin 112. The rotating portion 86 rotates in the lock releasing direction (the direction of arrow M1) against the urging force of the spring portion 84.

The spring portion 84 of the lock member 18 urges the two rotating portions 86 to move apart from one another in the vertical direction. Further, in the natural state of the spring portion 84, a vertical direction interval D1 between the rotating portions 86 of the lock member 18 is set to be slightly wider than an interval between the thin portions 50 of the case 30. Accordingly, in the state in which the lock member 18 is disposed at a predetermined position of the case 30, the rotating portions 86 are pressed by the thin portions 50 and are displaced upwardly and downwardly in directions of approaching each other. The elastic reaction force of the deformation of the spring portion 84 due to this displacement works to move the rotating portions 86 apart from each other in the vertical direction. In this way, the state in which the pivot pins 90 are inserted in the pivot holes 88 of the lock member 18 can be reliably maintained.

Due to the lock member 18 having the above-described configuration, essentially, the members which lock the two shutter members 16 can be made integral. Accordingly, as compared with a case in which a lock member is provided separately for each of the two shutter members 16, the lock member can be made larger.

As shown in FIGS. 2 and 3, the spring member 20, which is formed by bending a single wire at predetermined positions, is disposed between the two case members 14. As shown in detail in FIG. 4, two large loop portions 98 and two small loop portions 100 are formed at the spring member 20. The spring member 20 has a flat C shape having a central portion 102 between the large loop portions 98, and two end portions 104 reaching the end portions from the large loop portions 98. As can be understood from FIGS. 2 and 4, in the same way as the lock member 18, the spring member 20 also has a configuration having substantially line symmetry (symmetry by rotation) when viewed along the axis of symmetry J1. Further, when rotated around the axis of symmetry J1, the spring member 20 after rotation completely coincides with the spring member 20 before rotation.

As can be understood from FIGS. 5 through 9, the spring member 20 is formed such that the wires at the both sides of the large loop portion 98 are substantially parallel, and the wires at the both sides of the small loop portion 100 are positioned on the same straight line. Both types of loop portions are set to predetermined elasticities such that, when a force in the direction of changing the angle formed by the wires at both sides of the loop portion exceeds a predetermined value, the spring member 20 bends at that loop portion.

At the both ends of the spring member 20, the metal wire is bent upward and downward at substantially right angles such that hook portions 106 are formed. The guide piece 72 of the shutter member 16 is partially notched at the widthwise direction central side thereof such that a spring receiving portion 108 is formed therein. In the state in which the spring member 20 is assembled within the case 30 and the shutter members 16 are at their closed positions, the hook portions 106 engage with the spring receiving portions 108.

Figure 4:
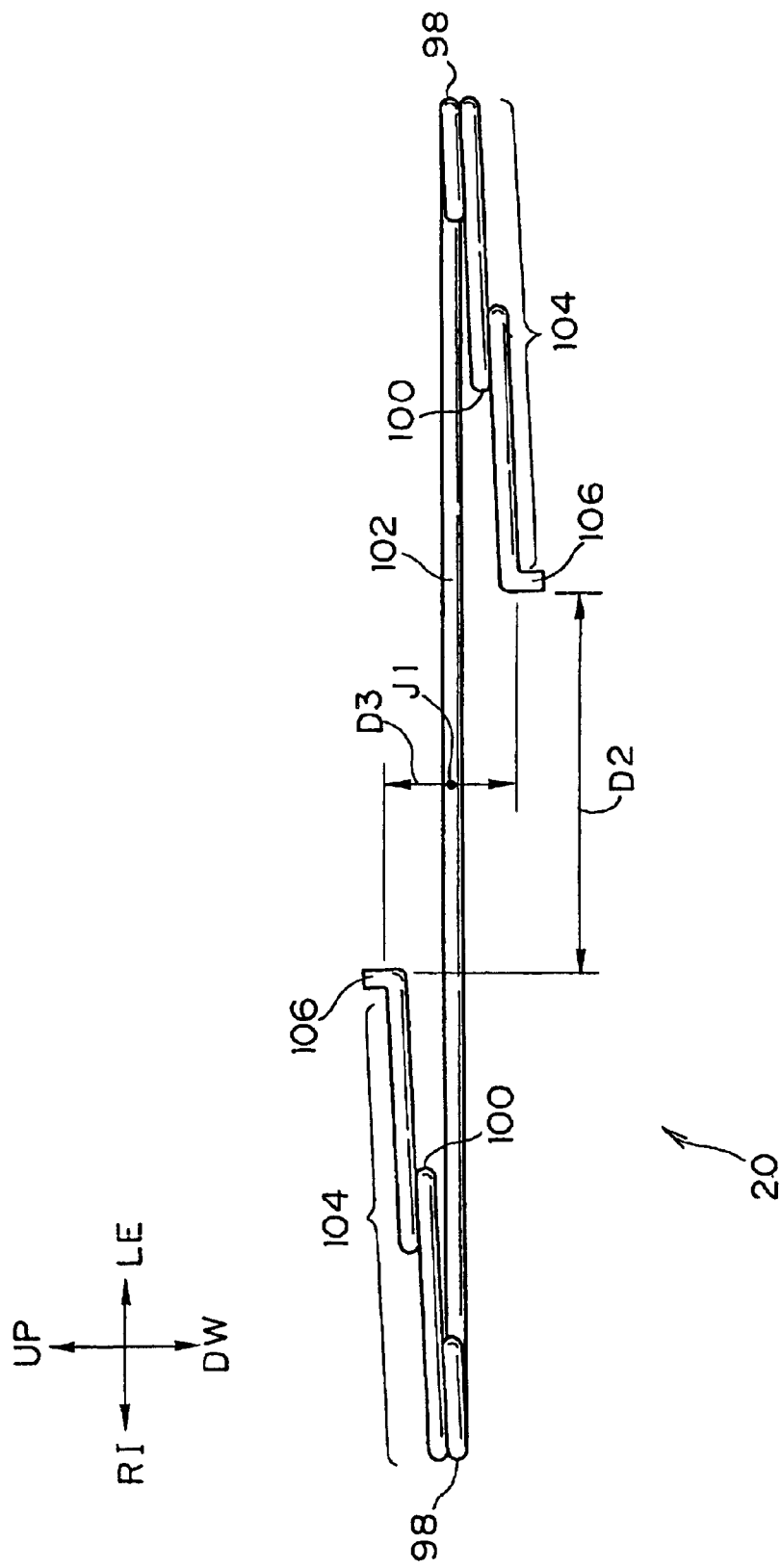
FIG. 4 is a front view showing a spring member forming the disk cartridge of the embodiments of the present invention.

As shown in FIG. 4, a left-right direction interval D2 between the hook portions 106 in the natural state is set to be shorter than the distance between the spring receiving portions 108 when the shutter members 16 are both at their closed positions. Accordingly, when both of the shutter members 16 are at their closed positions, the spring member 20 is deformed such that the interval D2 between the hook portions 106 widens slightly, and applies elastic force in the closing directions to the shutter members 16. When, from this state, the shutter member 16 attempts to move to the open position, because the hook portion 106 is pressed by the spring receiving portion 108, the spring member 20 deforms and applies an even greater elastic force in the direction of the closed position to the shutter member 16.

Figure 7:
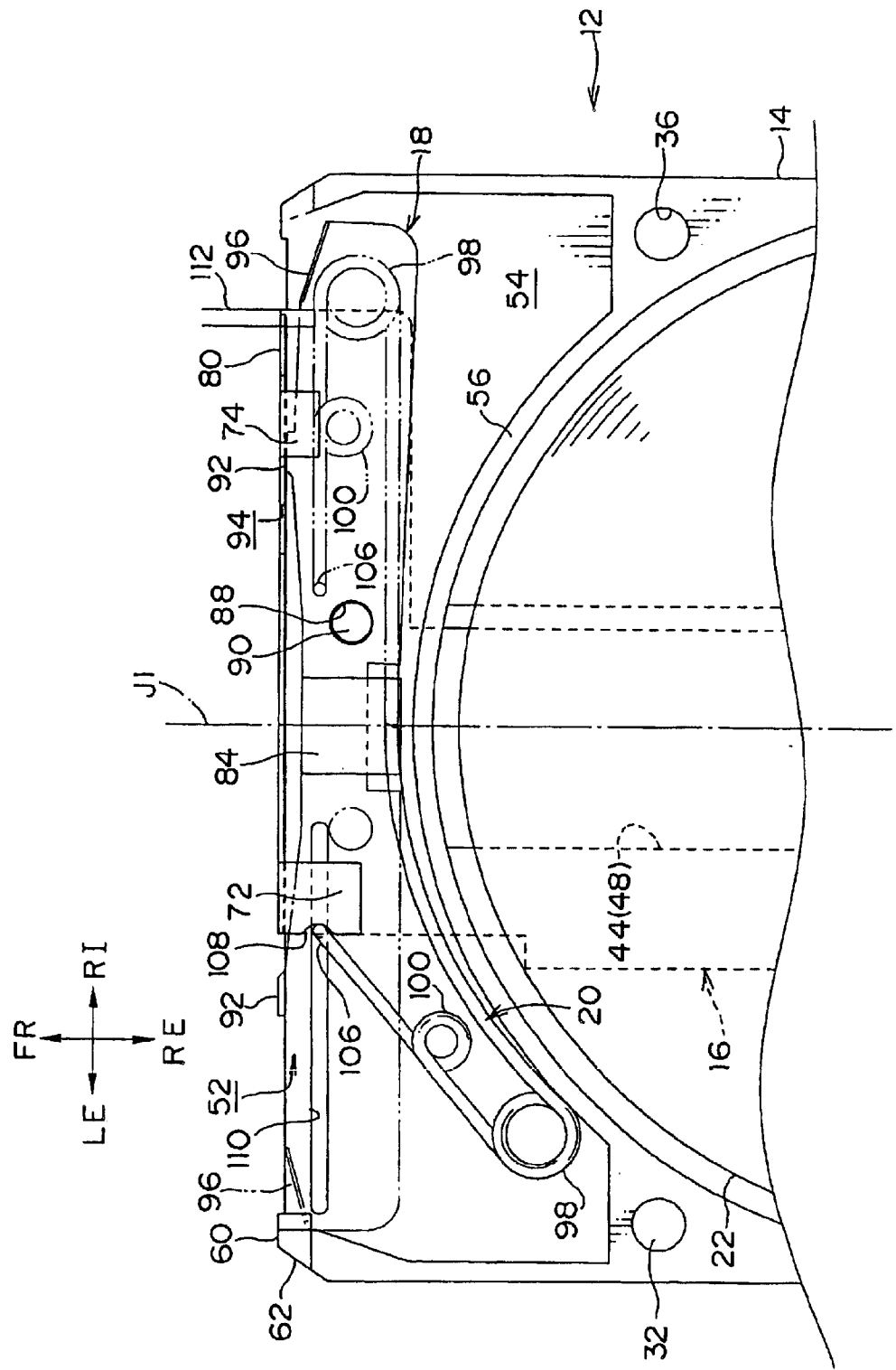
FIG. 7 is a diagram for explanation showing a state in which the shutter member is in the midst of moving from the closed position to an open position in the disk cartridge of the embodiments of the present invention.
Figure 8:
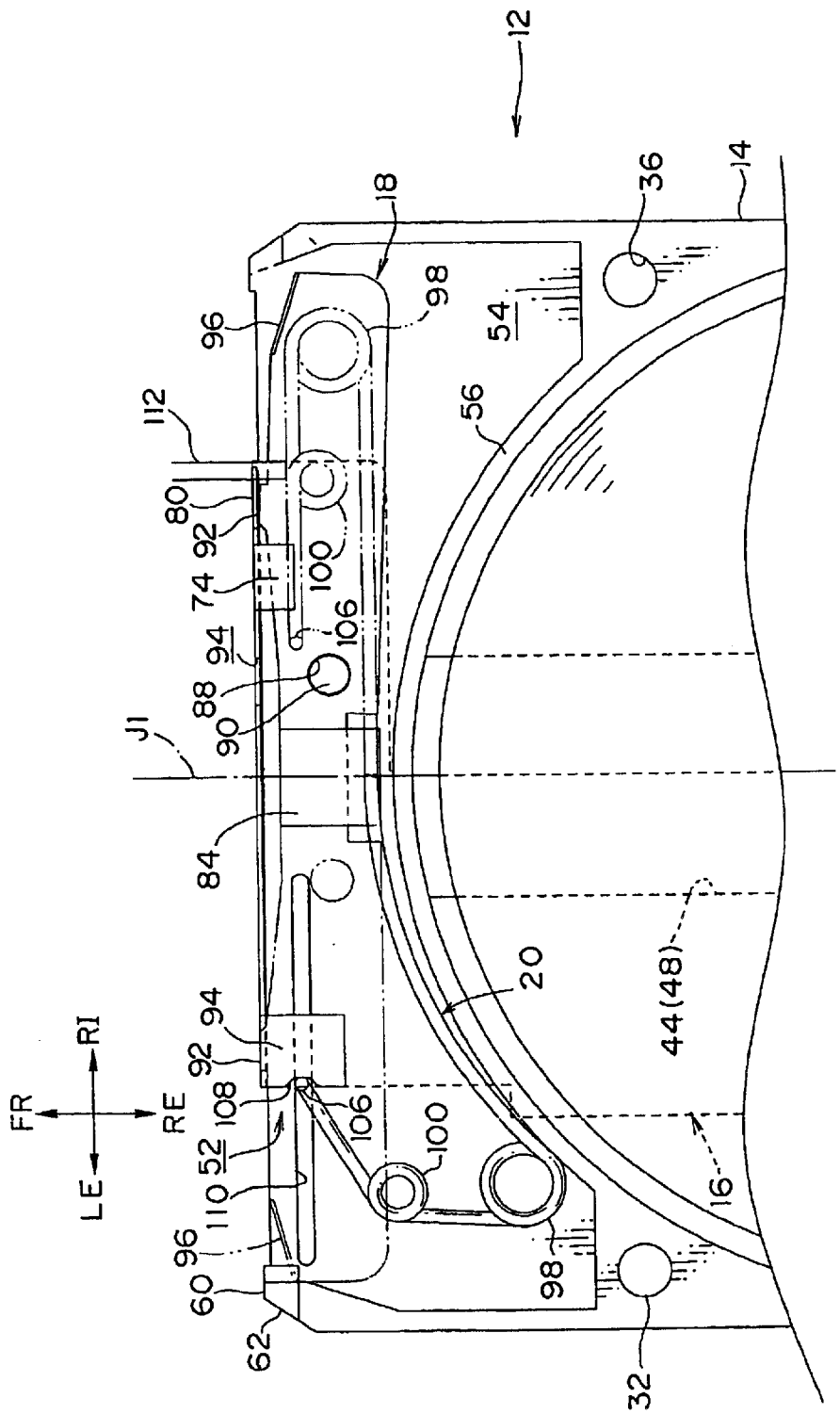
FIG. 8 is a diagram for explanation showing a state in which the shutter member is in the midst of moving from the closed position to the open position in the disk cartridge of the embodiments of the present invention.

At this time, at the spring member 20, as shown in FIG. 7, first, the wire at the portion from the center (the region on the axis of symmetry J1) to the large loop portion 98 bends along the separating wall 56, and the large loop portion 98 abuts the separating wall 56. Next, as shown in FIG. 8, while the wire at the portion from the large loop portion 98 to the small loop portion 100 widens toward the widthwise direction outer side (toward the left in FIG. 8), the wire bends at the small loop portion 100. Moreover, as shown in FIG. 9, when the shutter member 16 moves and reaches the open position, the small loop portion 100 abuts the side wall 58, and further deformation of the spring member 20 is limited. In this way, due to the spring member 20 being deformed in plural stages at predetermined regions set in advance, even if the spring accommodating/deforming region 54 is narrow, the spring member 20, before and after deforming or in the midst of deforming, can be reliably accommodated within the spring accommodating/deforming region 54, and can deform in a manner following the movement of the shutter member 16 from the closed position to the open position. In contrast, in a structure in which, for example, no small loop portion 100 is provided, as shown by the two-dot chain line in FIG. 9, the wire from the large loop portion 98 to the hook portion 106 does not bend. Thus, a portion of the distal end side of the wire projects further forward than the case member 14.

Further, the Deformation of the spring member 20 due to the movement of one shutter member 16 from the closed position to the open position, is limited to the portion corresponding to the shutter member 16 which is moving, i.e., half of the spring member 20 at one side of the axis of symmetry J1. In this way, the closed state of the other shutter member 16 is maintained. In other words, the portion which corresponds to the shutter member 16 which is in the closed state is fixed, and the central portion of the spring member 20 serves as a fixed end. Thus, only the portion corresponding to the shutter member 16 which is moving reliably deforms within the spring accommodating/deforming region 54, and applies elastic force in the closing direction to the shutter member 16.

A guide hole 110, which passes through in the direction of thickness, is formed in the thin portion 50 of the case member 14. The guide hole 110 is formed as an elongated hole along the left-right direction. A portion of the distal end side of the hook portion 106 (the portion further toward the distal end side than the portion which engages with the spring receiving portion 108) is inserted in the guide hole 110. In this way, movement of the hook portion 106 of the spring member 20 is guided, and inadvertent joggling in the front-rear direction is prevented. Moreover, due to the hook portion 106, which is being guided in this way, engaging with the spring receiving portion 108, joggling of the shutter member 16 in the front-rear direction is also prevented.

As shown in FIG. 4, the portions (the end portions 104) of the spring member 20 from the large loop portions 98 to the hook portions 106 are formed to be inclined toward the projecting directions of the hook portions 106 more than the portion between the two large loop portions 98 (the central portion 102). A vertical direction interval D3 between the end portions 104 is set to be slightly wider than a vertical direction interval between the guide pieces 72 of the shutter members 16. Accordingly, in the state in which the spring member 20 is disposed at a predetermined position of the case 30 (the state in which the hook portions 106 are positioned at the spring receiving portions 108), the end portions 104 are displaced upwardly and downwardly in directions of approaching each other. Further, the elastic reaction force of the deformation of the spring member 20 due to this displacement acts to move the hook portions 106 away from each other upwardly and downwardly, and pushes the guide pieces 72 upward or downward. In this way, the state in which the hook portions 106 are inserted in the guide holes 110 can be reliably maintained.

In the same way as the lock member 18, due to the spring member 20 having the above-described configuration, essentially, the members which urge the two shutter members 16 can be made integral. Accordingly, as compared with a case in which an urging member is provided separately for each of the two shutter members 16, the urging member can be made larger.

Next, the method of forming the disk cartridge 12 of the present embodiment by assembling the above-described respective members, and the operation of the disk cartridge 12 will be described.

In order to form the disk cartridge 12, first, the shutter members 16 are mounted to the case members 14. At this time, the shutter members 16 are mounted such that the contact pieces 70 contact the front edges 14A of the case members 14 and the case members 14 are nipped by the guide pieces 72, 74 and the shutter guide portions 68. Further, the guide pieces 76 are inserted into the guide holes 78. Due to these structures, the shutter members 16 are reliably mounted to the case members 14. In the present embodiment, the two case members 14 have the same configuration, and the two shutter members 16 have the same configuration. Accordingly, when mounting the shutter members 16 to the case members 14, there is no need to consider the relationship of correspondence between the case members 14 and the shutter members 16. Thus, as compared with a case in which the respective case members 14 have different shapes, it is easy to maintain dimensional accuracy, and easy to manage the number of parts. Further, the two case members 14 can be manufactured in the same manufacturing process in the same manufacturing device (e.g., a molding die). Similarly, the shutter members 16 as well can be manufactured in the same manufacturing process in the same manufacturing device (e.g., a press machine or a folding machine) In this way, the parts costs can be reduced.

In this way, the two case members 14, to which the shutter members 16 are mounted, are prepared. In the state in which one case member 14 is inverted and the medium accommodating portions 24 are made to oppose one another, the disk medium 22 is accommodated into one medium accommodating portion 24. Then, the two case members 14 are assembled together and made integral, and as shown in FIG.

1, the case 30 is formed. At this time, when the corresponding bosses 32, 34 are fit-together with the fit-together holes 36, 38, the case members 14 are maintained in their superposed state, and do not inadvertently separate from one another.

Next, the spring member 20 is mounted. The vertical direction interval D3 between the end portions 104 of the spring member 20 is set to be slightly wider than the vertical direction interval between the guide pieces 72 of the shutter members 16. Thus, the end portions 104 are displaced so as to slightly approach one another in the vertical direction, and the spring member 20 is inserted into the spring accommodating/deforming region 54 from the outer side of the case 30. When the spring member 20 is disposed at a predetermined position of the case 30, the distal ends of the hook portions 106 are inserted into the spring receiving portions 108 of the shutter members 16. Here, when the force making the end portions 104 approach one another in the vertical direction is cancelled, the elastic reaction force of the spring member 20 is applied so as to make the hook portions 106 move apart from each other in the vertical direction. Thus, the hook portions 106 are inserted into the guide holes 110, and this state can reliably be maintained. Further, the spring member 20 can be held at a predetermined position within the case 30 without providing, at the case member 14 or at the shutter member 16, a member for holding the spring member 20. In addition, because there is no need to make the spring member 20 excessively small-sized, assembly of the spring member 20 is easy.

Further, the widthwise direction interval D2 between the hook portions 106 in the natural state is set to be shorter than the distance between the spring receiving portions 108 at the time when both of the shutter members 16 are at their closed positions. Thus, elastic force in the closing directions is applied to the shutter members 16 from the spring member 20.

Finally, the shutter members 16 are set at their closed positions, and the lock member 18 is installed. The vertical direction interval D1 between the rotating portions 86 of the lock member 18 is set to be slightly wider than the interval between the thin portions 50 of the case 30. Thus, the rotating portions 86 are displaced so as to approach one another in the vertical direction, and the lock member 18 is inserted into the entry groove 52 from the front side of the case 30. When, in the state in which the positions of the pivot holes 88 and the pivot pins 90 coincide as seen in the vertical direction, the force for making the rotating portions 86 approach one another upwardly and downwardly is cancelled, the elastic reaction force of the spring portion 84 acts to move the rotating portions 86 upwardly and downwardly away from one another. Thus, the pivot pins 90 are inserted into the pivot holes 88, and this state can be reliably maintained. Further, because the locking convex portions 92 engage with the locking concave portions 94, the shutter member 16 (the case 30) being locked at their closed positions.

Note that the order in which the lock member 18 and the spring member 20 are assembled is not limited, and may be the opposite of that described above.

As described above, the disk cartridge 12 of the present embodiment is formed in a state in which the disk medium 22 is accommodated at the interior thereof. Thus, the disk cartridge 12 can be loaded into a drive device, and reading or writing of information can be carried out. Due to reference pins (not shown) of the drive device being inserted into the circular hole 26 and the elongated hole 28, the case members 14 are positioned within the drive device.

When information is to be written onto or read from the disk medium 22, first, as shown in FIG. 6, the shutter opening/closing pin 112 of the drive device slides and enters into the entry groove 52 from a widthwise direction end portion of the disk cartridge 12. While entering in, the shutter opening/closing pin 112 first contacts the pushed piece 96 of the lock member 18 due to the taper surface 62 of the convex portion 60. When the shutter opening/closing pin 112 enters in further, the pushed piece 96 is pushed, and the rotating portion 86 rotates in the lock releasing direction (the direction of arrow M1) against the elastic force of the spring portion 84. Thus, the locking convex portion 92 separates from the locking concave portion 94, and the locking of the shutter member 16 is cancelled. At this time, no force whatsoever in the lock releasing direction is applied to the rotating portion 86 at the side where the shutter opening/closing pin 112 has not entered. Therefore, the corresponding shutter member 16 is reliably locked at the closed position.

When the shutter opening/closing pin 112 enters further into the entry groove 52, the shutter opening/closing pin 112 contacts the pressed rib 80 of the shutter member 16 and pushes the shutter member 16 toward the open position. In this way, as shown in FIGS. 7 and 8, the shutter member 16 moves toward the open position while one side portion of the spring member 20 is gradually deformed (the shutter member 16 moves toward the open position against the elastic force accompanying the deformation). As shown in FIG. 9, when the shutter member 16 reaches the open position, the opening 44 is opened. Thus, the rotating/driving member of the drive device can access the disk medium 22 from the opening portion 46 for rotating/driving, and can rotate the disk medium 22. Further, the reading/writing member can access the disk medium 22 from the opening portion 48 for reading/writing, and can write information onto or read information from the disk medium 22.

In the above-described operations for opening the shutter member 16, only one shutter member 16 is independently opened. As can be understood from FIG. 1 as well, the disk cartridge 12 of the present embodiment is structured so as to be completely symmetrical around the axis of symmetry J1. Thus, when accessing the opposite side of the disk medium 22 to read or write information, it suffices to turn the disk cartridge 12 upside down and load it into the drive device.

As described above, in the disk cartridge 12 of the present embodiment, the two case members 14 forming the case 30 have the same configuration, and the shutter members 16 have the same configuration. In addition, only the one lock member 18 and only the one spring member 20 are provided for the two case members 14 and the two shutter members 16. Accordingly, as compared with a case in which the case members have respectively different configurations and/or the shutter members have respectively different configurations, or a case in which two lock members and two spring members are provided for the two case members and the two shutter members, the number of parts can be reduced, management of the number of parts is facilitated, and the parts costs can be reduced. Further, by reducing the number of parts, the assembly of the respective parts is facilitated, and thus, the assembly costs can also be reduced.

In a case in which a small-sized medium is used as the disk medium 22, it is preferable to make the case members 14, the shutter members 16, the lock member 18, and the spring member 20 small-sized in accordance with the small size of the disk medium 22. These respective members can be easily assembled even when they are made to be small-sized. With regard to the lock member 18 and the spring member 20 in particular, by being provided as an integral member at the center as in the present embodiment, each of the lock member 18 and the spring member 20 can be made to be substantially larger than in a structure in which a lock member and a spring member are provided separately for each of the two shutter members 16. Therefore, assembly of the lock member 18 and the spring member 20 is easy. For example, in the disk cartridge 12 of the present embodiment, even when the length of the longest side of the case member 14 is about 30 mm to 40 mm or even smaller than that, assembly of the respective members is not difficult.

In the disk cartridge of the present embodiment, the materials of the respective members are not particularly limited provided that they have the required properties. For example, by forming the case members 14 of resin, both maintaining of strength and lightening of weight can be achieved. In contrast, by forming the shutter members 16 and the lock member 18 of metal, the strength can be improved. Moreover, if the spring member 20 as well is formed of metal, a predetermined elasticity can be easily obtained.

The disk medium 22 relating to the present embodiment is not particularly limited provided that information can be written thereon and read therefrom. For example, a medium employing any of various types of recording methods, such as recording of information by light, or recording of information by magnetism, or the like, can be utilized.

In the present embodiment, the single lock member 18 and the single spring member 20 are provided for the two shutter members 16. However, the present embodiment is not limited to the same. It is possible that two lock members 18 are provided and each of these corresponds to respective shutter members 16. Also, it is possible that two spring members 20 are provided and each of these corresponds to respective shutter members 16.

Because the present embodiment has the above-described structure, the manufacturing cost can be reduced and assembly can be facilitated due to the disk cartridge having a small number of parts. In particular, even in a case in which the disk medium is small, assembly can be facilitated.

Next, a disk cartridge 12A of a second embodiment of the present invention will be described. The basic structure of the disk cartridge 12A of the second embodiment is substantially similar to that of the disk cartridge 12 relating to the first embodiment. Therefore, the same portions are designated by the same reference numerals, description thereof is omitted, and only the points which differ will be described.

Figure 11:
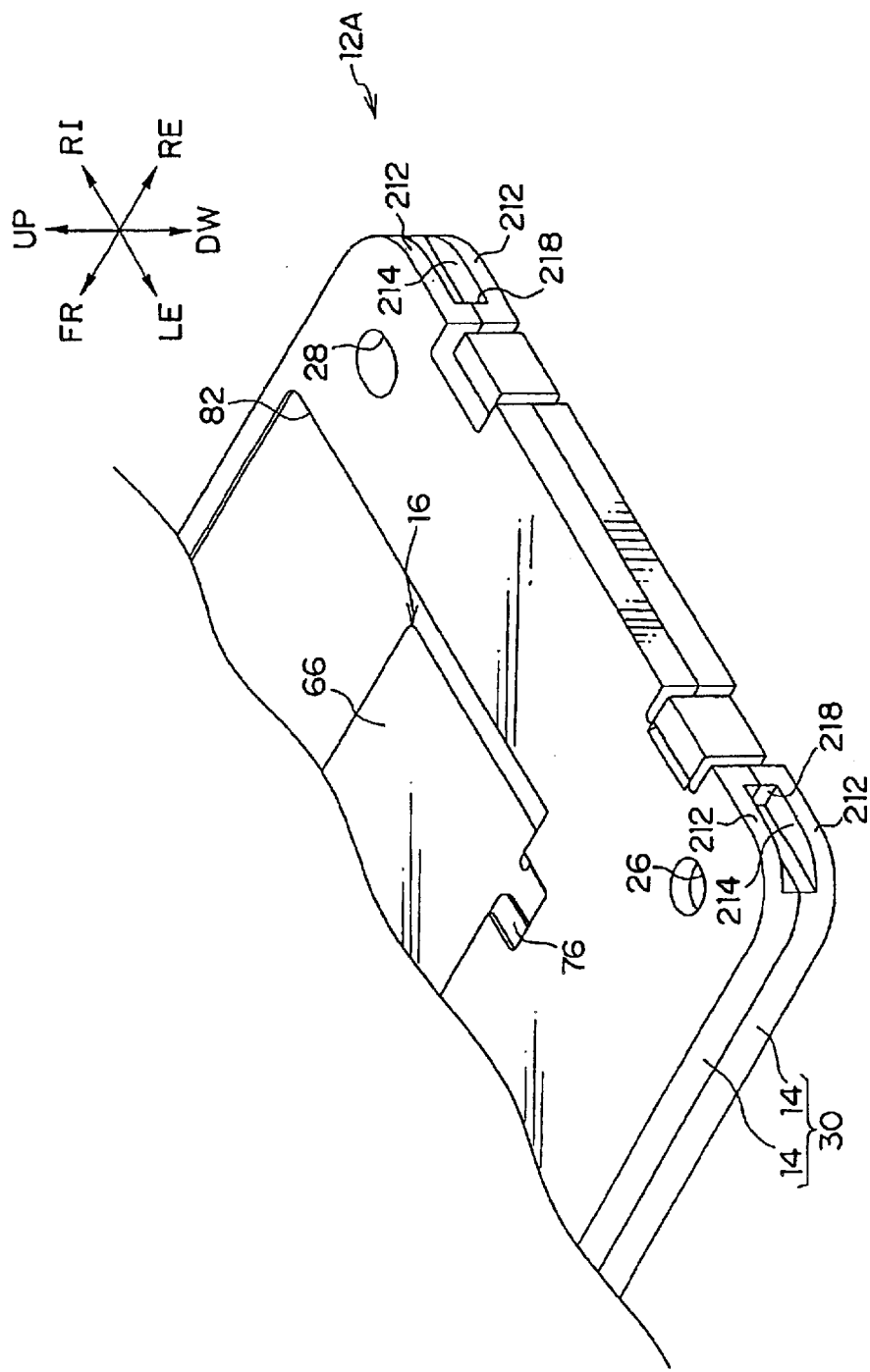
FIG. 11 is a perspective view of a vicinity of a rear end portion of the disk cartridge relating to the embodiments of the present invention.
Figure 12:
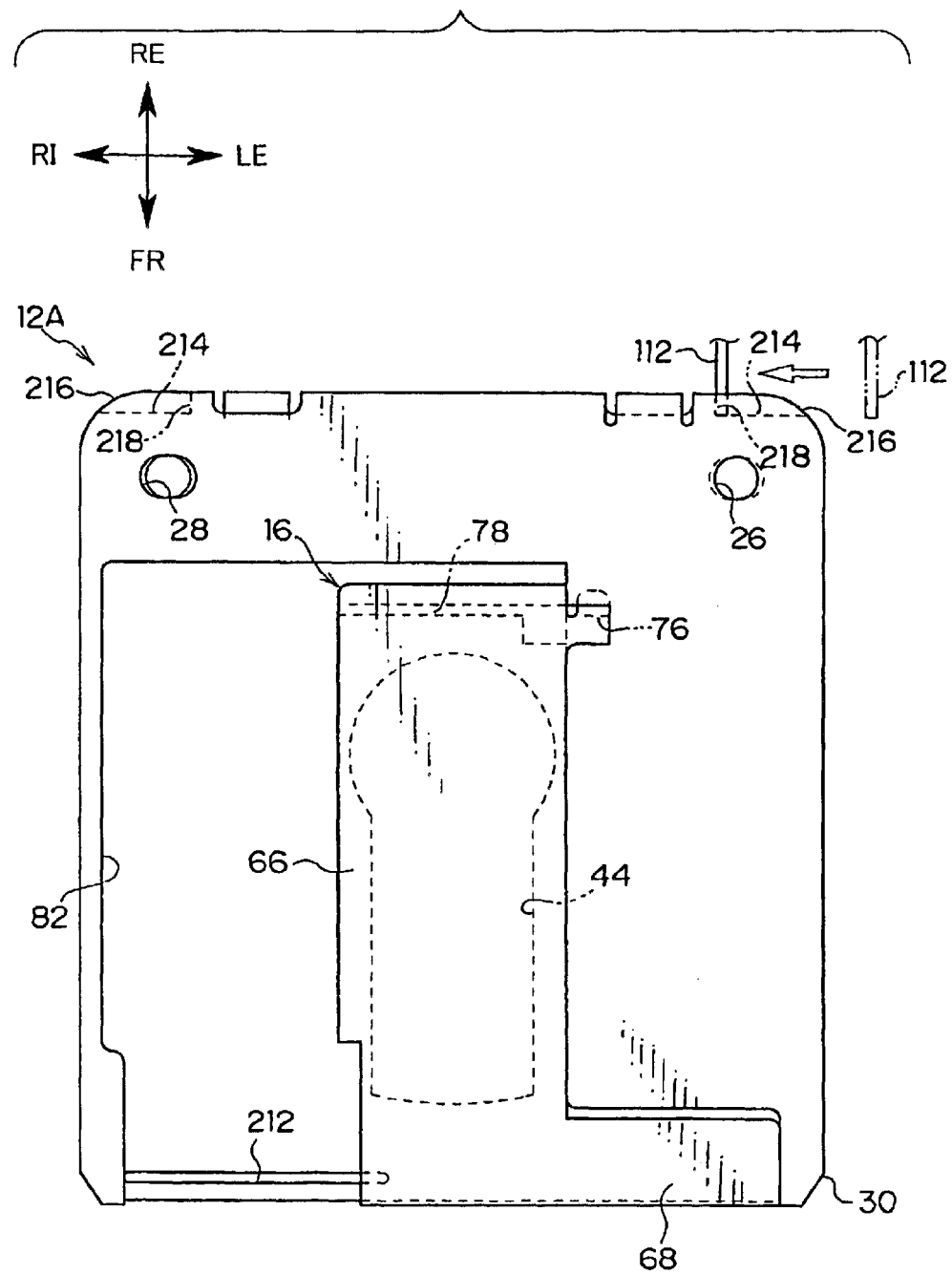
FIG. 12 is a plan view showing an opening/closing lever and the vicinity of the rear end portion of the disk cartridge relating to the embodiments of the present invention.

As shown in FIG. 11, a thin portion 212 is formed in the rear end surface of the shell member 14 at each of the end portions along the widthwise direction. When the cartridge case 30 is formed by the pair of shell members 14, a dummy groove 214 is formed at each end portion along the widthwise direction at the rear end surface of the cartridge case 30 by the pair of thin portions 212. The dummy grooves 214 extend so as to be long and narrow along the opening/closing direction of the shutter members 16. The widthwise direction outer side end portion of the dummy groove 214 is an opening portion 216 which opens in a vicinity of the corner portion of the cartridge case 30. The end portion of the dummy groove 214 at the side opposite the opening portion 216 is a stopper portion 218 which is formed at the outer surface portions of the shell members 14. Here, the stopper portion 218 is positioned at the widthwise direction outer side of the engaging piece (pressed rib) 80 of the shutter member 16 at the open position (see FIG. 9).

Figure 10:
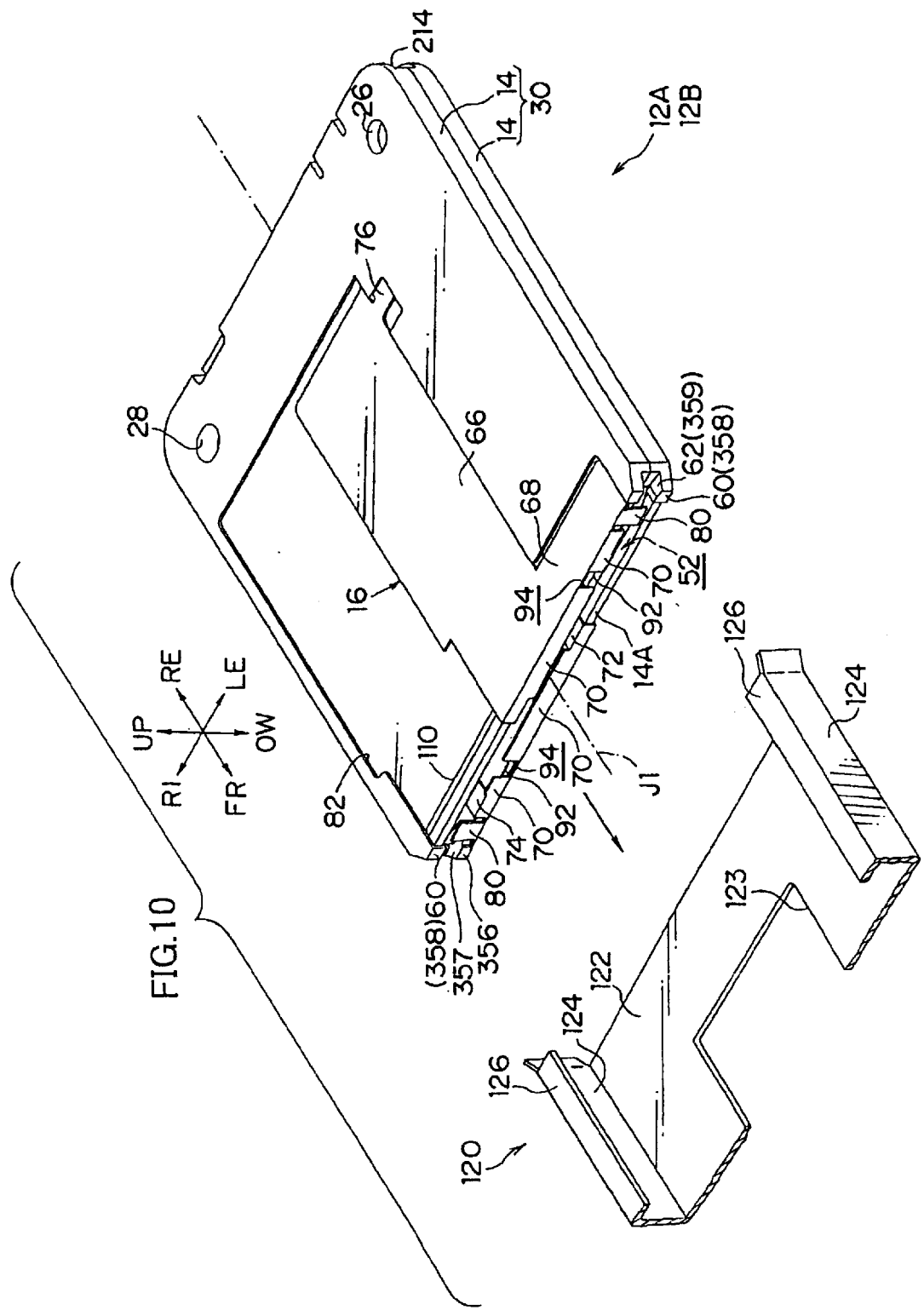
FIG. 10 is a perspective view showing the disk cartridge relating to the embodiments of the present invention, and a cartridge holder in a drive device in which the disk cartridge is loaded.

Next, the drive device, into which the disk cartridge 12A having the above-described structure can be loaded and from which the disk cartridge 12A can be removed, will be briefly described. A cartridge holder 120, into which the disk cartridge 12A is inserted, is provided at the drive device. The cartridge holder 120 is formed from a metal plate. As shown in FIG. 10, the cartridge holder 120 has a bottom plate portion 122 on which the disk cartridge 12A is placed. An opening portion 123, which corresponds to the window portion 44 (the disk cartridge opening portion) of the disk cartridge 12A, is formed in the bottom plate portion 122. Side plate portions 124, which are bend upwardly, are formed at the both widthwise direction end portions of the bottom plate portion 122 of the cartridge holder 120. An upper guide portion 126, which is bent toward the widthwise direction inner side, is formed at the top end portion of each side plate portion 124.

Here, the dimension (the opening width) between the pair of side plate portions 124 at the cartridge holder 120 is slightly wider than the outside dimension, along the left-right direction, of the cartridge case 30, but is more narrow than the outside dimension, along the front-back direction, of the cartridge case 30. The dimension between the bottom plate portion 122 and the upper guide portions 126 at the cartridge holder 120 is slightly wider than the thickness of the cartridge case 30. In this way, the cartridge case 30 can be inserted into the cartridge holder 120 only when the front-back direction of the cartridge case 30 coincides with the direction of insertion into the cartridge holder 120.

A stopper portion (not shown), which impedes movement of the disk cartridge 12A in the insertion direction when the disk cartridge 12A is inserted to a predetermined loaded position within the cartridge holder 120, is provided at the drive device. Further, a pair of positioning pins, which can fit into the circular hole 26 and the elongated hole 28 at the bottom surface side of the cartridge case 30, is disposed at the drive device. In this way, the disk cartridge 12A, which has been inserted to the loaded position within the cartridge holder 120, is accurately positioned so as to be in a predetermined positional relationship with respect to the spindle and the recording/playback head of the drive device.

Further, as shown in FIGS. 5 through 9, the pin-shaped opening/closing lever (shutter opening/closing pin) 112, which is for opening and closing the shutter member 16 of the disk cartridge 12, is disposed at the drive device. The opening/closing lever 112 is supported so as to be movable along the widthwise direction of the disk cartridge 12A by a shutter opening/closing mechanism (not shown). Here, at the time when the disk cartridge 12A is loaded into the drive device, the shutter opening/closing mechanism moves the opening/closing lever 112 from the standby position shown in FIG. 5 to the shutter open position shown in FIG. 9. At the time of discharging the disk cartridge 12A from the drive device, the shutter opening/closing mechanism moves the opening/closing lever 112 from the open position to the standby position.

Next, operation of the disk cartridge 12A, which relates to the present embodiment and is structured as described above, will be described.

When the disk cartridge 12A is loaded into a drive device, the disk cartridge 12A is inserted along the front-back direction into the cartridge holder 120. At this time, as shown in FIG. 10, the disk cartridge 12A is inserted into the cartridge holder 120 so as to be oriented such that the front end surface of the cartridge case 30A, at which the guide groove (entry groove) 52 is formed, is the leading surface.

When the disk cartridge 12A is inserted to the loaded position within the cartridge holder 120, the pair of positioning pins is inserted into the circular hole 26 and the elongated hole 28 of the disk cartridge 12A, and the disk cartridge 12A is set in a state of being fixed at the loaded position.

When the disk cartridge 12A is inserted at the loaded position within the cartridge holder 120, the shutter opening/closing mechanism of the drive device moves the opening/closing lever 112 from the standby position at the outer side of the disk cartridge 12A toward the shutter open position side. In this way, the distal end portion of the opening/closing lever 112 enters into the guide groove 52, and as shown in FIG. 6, abuts the pushed piece 96 of the lock member 18. At this time, the distal end portion of the opening/closing lever 112 reliably abuts the pressed piece 96 by being guided by the taper surface 62 of the convex portion 60 provided at the entrance portion of the guide groove 52. When the opening/closing lever 112 advances further toward the shutter open position side, the pressed piece 96 is pressed, and the rotating portion 86 rotates in the lock releasing direction against the elastic force of the spring portion 84. Thus, the locking convex portion 92 moves apart from the locking concave portion 94, and the locking of the shutter member 16 is released.

When the opening/closing lever 112 proceeds even further in the guide groove 52 toward the shutter open position side, the opening/closing lever 112 contacts the engaging piece 80 of the shutter member 16 and pushes the shutter member 16 toward the open position. In this way, the shutter member 16 moves toward the open position while gradually deforming one side portion of the spring member 20. When the opening/closing lever 112 moves to the shutter open position shown in FIG. 9, the shutter opening/closing mechanism stops the opening/closing lever 112. The shutter member 16 is held at the open position by the opening/closing lever 112, and the window portion 44 is opened. Thus, the drive device can rotate the recording disk 22 by inserting the spindle through the window portion 44 into the cartridge case 30 and connecting the spindle to the center hub 46. Further, the drive device can apply a light beam, magnetism, or the like from the recording/playback head through the window portion 44 to the recording surface at the lower surface side of the recording disk 22, such that information can be written onto or read from this recording surface.

Cases may arise in which, when an attempt is made to load the disk cartridge 12A into the drive device, the disk cartridge 12A is incorrectly inserted into the cartridge holder 120 in a state in which the cartridge case 30 is rotated by 180° with respect to the correct direction of insertion, i.e., in a state in which the rear end surface, which is at the side opposite the front end surface where the guide groove 52 is formed, is the leading surface. In such a case as well, the disk cartridge 12A can be inserted to the loaded position within the cartridge holder 120 without the insertion thereof into the cartridge holder 120 being impeded by the pair of side plate portions 124 (see FIG. 10).

At the drive device, when the disk cartridge 12A is inserted to the loaded position within the cartridge holder 120 with the rear end surface of the disk cartridge 12A being the leading surface, the shutter opening/closing mechanism is operated. In this way, the opening/closing lever 112 moves from the standby position toward the shutter open position. At this time, because the dummy grooves 214 are formed in the rear end surface of the cartridge case 30 at a region corresponding to the guide groove 52 of the front end surface, the distal end portion of the opening/closing lever 112 passes through and enters into the dummy groove 214. Further, because the stopper portion 218 of the dummy groove 214 is positioned at the widthwise direction outer side of the engaging piece 80 of the shutter member 16, the distal end portion of the opening/closing lever 112 abuts the stopper portion 218 at a position at the near side of the shutter open position, and movement of the opening/closing lever 112 toward the shutter open position is restricted.

Accordingly, due to the drive device detecting that the opening/closing lever 112 has been stopped at the position corresponding to the stopper portion 218 at the near side of the shutter open position, the drive device can recognize that the disk cartridge 12A has been inserted into the cartridge holder 120 in a state of being oriented oppositely to its orientation when correctly inserted. Further, it is possible to prevent the shutter opening/closing mechanism or the disk cartridge 12A from breaking due to the distal end portion of the opening/closing lever 112 colliding against the cartridge case 30 when the disk cartridge 12A is inserted into the cartridge holder 120 in this state of being oriented oppositely to the correct orientation.

Description has been given of a case in which, in the drive device relating to the present embodiment, after the disk cartridge 12A is inserted to the loaded position within the cartridge holder 120, the opening/closing lever 112 is moved from the standby position toward the shutter open position, and the shutter member 16 is opened. However, in addition to such a shutter opening/closing mechanism, there is, for example, a shutter opening/closing mechanism which opens the shutter member 16 by a shutter opening/closing member, interlockingly with the operation of inserting the disk cartridge 12A into a loading portion such as a cartridge holder or the like. When such a shutter opening/closing mechanism is used in a drive device, in accordance with the disk cartridge 12A of the present embodiment, insertion of the disk cartridge 12A to the loaded position is impeded due to the shutter opening/closing member abutting the stopper portion 218 of the dummy groove 214 while the disk cartridge 12A is being inserted to the loading portion. Thus, it can easily be recognized that the user has inserted the disk cartridge 12A into the loading portion in a state in which the disk cartridge 12A is oriented oppositely.

As described above, in accordance with the disk cartridge of the present embodiment, at the time of loading the disk cartridge into a disk drive device, it can easily be recognized that the direction of insertion of the cartridge case is incorrect.

Next, a disk cartridge 12B of a third embodiment of the present invention will be described. The basic structure of the disk cartridge 12B of the third embodiment is substantially similar to that of the disk cartridge 12A relating to the second embodiment. Therefore, the same portions are designated by the same reference numerals, description thereof is omitted, and only the points which differ will be described.

Figure 13:
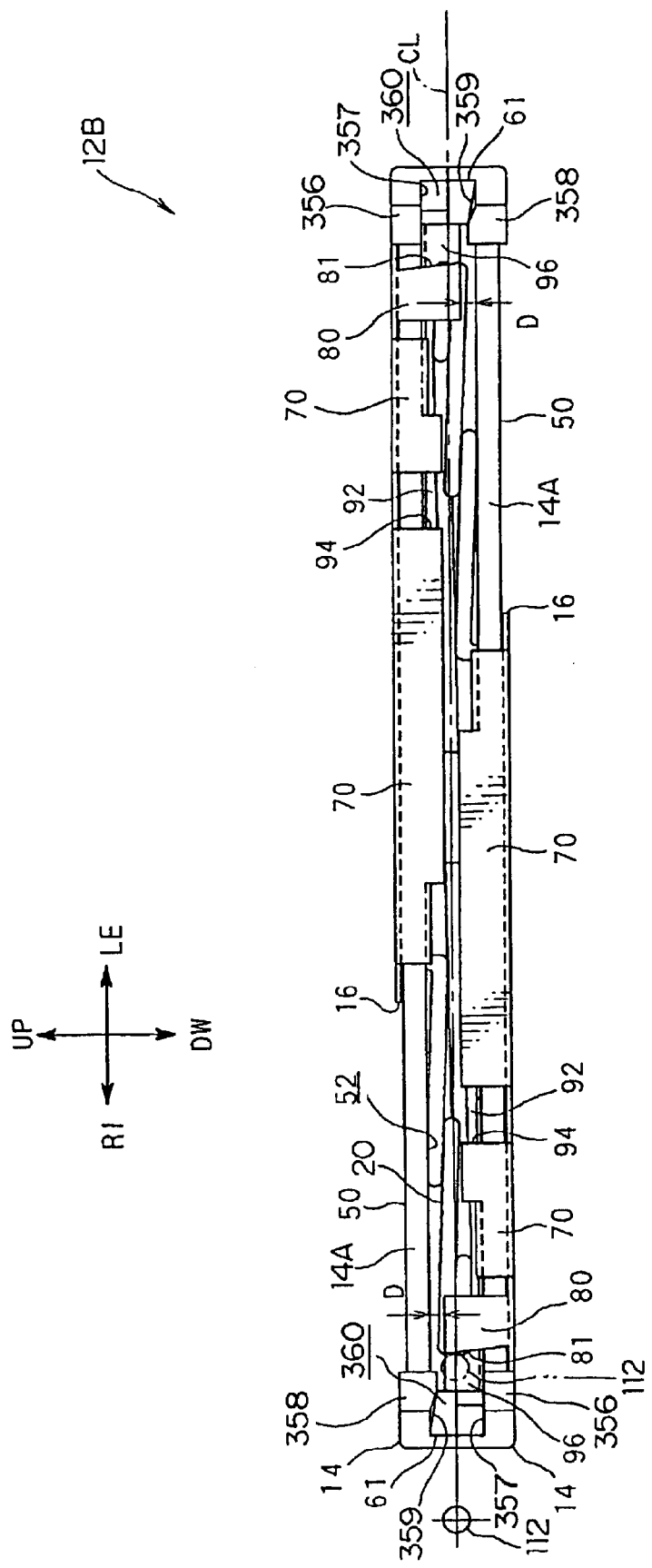
FIG. 13 is a front view seen from the front of the disk cartridge relating to the embodiments of the present invention.

As shown in FIG. 10, guiding convex portions 356, 358, which project slightly forward of the thin portions 50, are formed at the both end portions of the front edge side of the shell member 14. Among these guiding convex portions 356, 358, the one guiding convex portion 356 is slightly thicker than the thin portion 50. A guide surface 357, which is the inner side surface of the guiding convex portion 356 along the thickness direction thereof, is a planar surface as shown in FIG. 13 and is flush with the inner side surface of the thin portion 50.

The other guiding convex portion 358 at the shell member 14 is formed in a substantial wedge shape such that the thickness at the widthwise direction outer side end portion of the guiding convex portion 358 is substantially the same as the thickness of the one guiding convex portion 356, and the thickness gradually increases from this outer side end portion toward the inner side. Here, a sloping guide surface 359, which is inclined so as to approach the guiding convex portion 356 of the opposing shell member 14 from the widthwise direction outer side end portion toward the widthwise direction inner side end portion, is formed at the surface of the guiding convex portion 358 at the inner side along the thickness direction. The widthwise direction inner side end portion of the guide surface 359 projects into the insertion opening 52 with respect to the thin portion 50.

Accordingly, the guide surfaces 357 of the guiding convex portions 356 and the guide surfaces 359 of the guiding convex portions 358 oppose one another at the both end portions of the front edge side of the cartridge case 30 which is structured by the pair of shell members 14. Guide grooves 360, which extend from the end portions toward the center at the front end surface of the cartridge case 30, are formed between the guide surfaces 357 and the guide surfaces 359. An opening end 61 at the widthwise direction outer side of the guide groove 360 (see FIGS. 14A and 14B) is an entrance/exit for the opening/closing lever 112 of the drive device which will be described later. The widthwise direction inner side end portion of the guide groove 360 communicates with the insertion opening 52. Here, a groove width W1 of the guide groove 360 at the opening end 61 thereof is substantially equal to the opening width of the insertion opening 52 along the thickness direction. A groove width W2 of the guide groove 360 at the widthwise direction inner side end portion thereof is more narrow, by a predetermined dimension, than the opening width of the insertion opening 52 along the thickness direction.

The guiding convex portions 356, 358, which are formed at the end portions of the front edge sides of the shell members 14, project with respect to the front end surfaces of the thin portions 50. Thus, the shutter members 16 do not project forward with respect to the shell members 14.

As can be seen from FIG. 13, a clearance D is formed along the thickness direction between the distal end portion of the pushing piece 80 and the inner surface of the thin portion 50 of the opposing shell member 14. The clearance D is at least wider than the thickness of the shutter member 16. In other words, the length by which the pushing piece 80 projects into the insertion opening 52 along the thickness direction is shorter, by the clearance D, than the opening width of the insertion opening 52. In this way, when one shutter member 16 is moved to the open position, the distal end portion of the pushing piece 80 thereof does not interfere with the guide piece 72 of the other shutter member 16. Accordingly, a projecting length L (see FIG. 14B) of the pushing piece 80, which is the length by which the pushing piece 80 projects at the insertion opening 52 of the shutter member 16, is shorter, by the clearance D, than the opening width (=W1) of the insertion opening 52, in order to not interfere with the shutter member 16 disposed at the opposite side of the cartridge case 30.

Figure 14A:
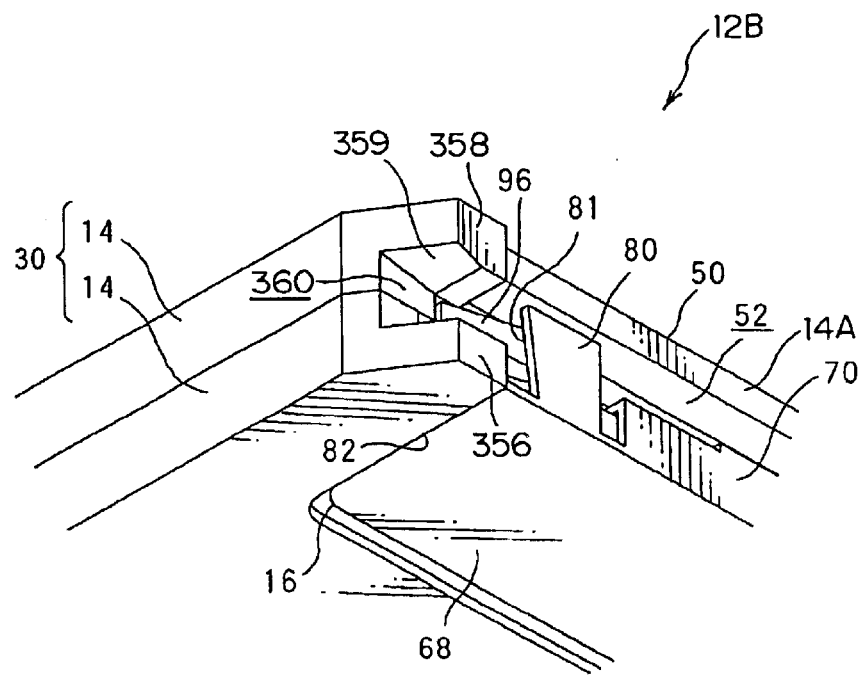
FIGS. 14A and 14B are a perspective view and a front view showing, in an enlarged manner, a vicinity of a front edge portion of the disk cartridge relating to the embodiments of the present invention.
Figure 14B:
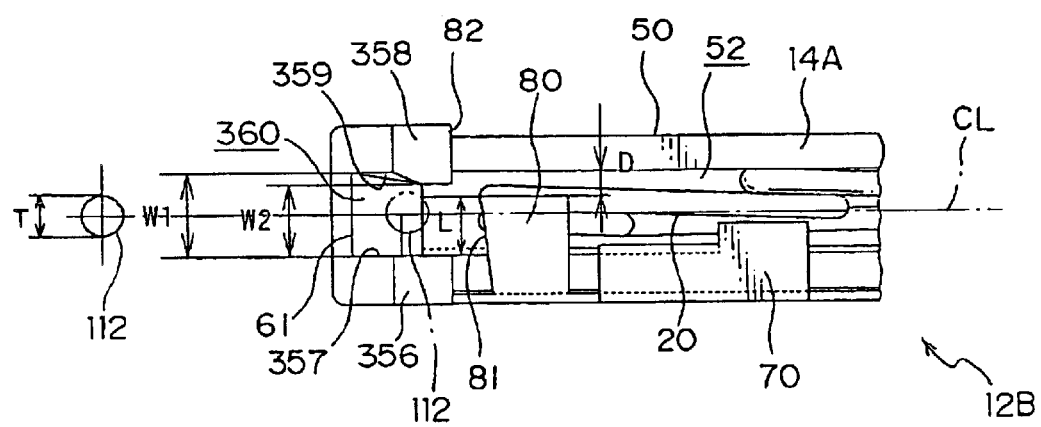

Here, the outer side end surface portion of the pushing piece 80 is a pushed portion 81 which is pushed by the opening/closing lever 112 at the time of opening and closing the shutter member 16. As shown in FIGS. 14A and 14B, the pushed portion 81 is inclined toward the widthwise direction outer side, from the base side of the pushing piece 80 toward the distal side thereof. In this way, when the opening/closing lever 112 applies pushing force along the widthwise direction to the pushed portion 81, the component of force directed toward the base side of the pushing piece 80 is applied to the opening/closing lever 112 as reaction force from the pushed portion 81.

Next, operation of the disk cartridge 12B, which relates to the present embodiment and which is structured as described above, will be described.

When the disk cartridge 12B is inserted to the loaded position, the shutter opening/closing mechanism of the drive device moves the opening/closing lever 112 from the standby position at the widthwise direction outer side of the disk cartridge 12B toward the shutter open position. At this time, at the front edge portion of the cartridge case 30, the opening end 61 of the guide groove 360 is open so as to face the distal end portion of the opening/closing lever 112 which is at the standby position. In this way, the distal end portion of the opening/closing lever 112 passes through the opening end 61 and enters into the guide groove 360, and as shown in FIGS. 5 and 14B, moves within the guide groove 360 toward the shutter open position.

Here, as described above, the groove width W1 (see FIGS. 14A and 14B) of the opening end 61 of the guide groove 360 is substantially equal to the opening width of the insertion opening 52. Accordingly, the opening/closing lever 112 is designed so as to move from the standby position toward the shutter open position, in the state in which the central point of the opening/closing lever 112 along the thickness direction thereof corresponds to a widthwise direction central line CL (see FIG. 14B) of the opening end 61 and the insertion opening 52. However, due to effects such as errors in the relative positioning of the opening/closing lever 112 with respect to the disk cartridge 12B, deformation such as warping or the like arising over time at the opening/closing lever 112, and the like, an error of a certain extent of course arises between the actual position of the opening/closing lever 112 along the thickness direction and the position thereof as per the original design.

At this time, the magnitude of the error (vertical error) allowed at the opening/closing lever 112 is a length corresponding to the difference between a thickness T of the opening/closing lever 112 and the groove width W1. If this vertical error is larger than a length corresponding to the difference between the thickness T of the opening/closing lever 112 and the groove width W1, the opening/closing lever 112 cannot be inserted into the guide groove 360. In other words, if the difference between the thickness T of the opening/closing lever 112 and the groove width W1 is sufficiently larger than the vertical error of the opening/closing lever 112, the opening/closing lever 112 at the standby position can reliably be inserted into the guide groove 360. In the disk cartridge 12B of the present embodiment, by making the groove width W1 be sufficiently long with respect to the vertical error of the opening/closing lever 112, the opening/closing lever 112 can reliably be inserted into the guide groove 360 at the time of opening the shutter member 16.

Here, if the vertical error of the opening/closing lever 112 is sufficiently small, in the state in which the opening/closing lever 112 is inserted in the guide groove 360, the opening/closing lever 112, which is moving toward the shutter open position, passes through the guide groove 360 and moves into the insertion opening 52 without contacting the guide surface 357. In contrast, if the vertical error of the opening/closing lever 112 is large and near the limit of the allowable range, when the opening/closing lever 112 is offset upwardly with respect to the central line CL, the opening/closing lever 112 passes through the guide groove 360 while contacting the guide surface 359, and moves into the insertion opening 52. If the opening/closing lever 112 is offset downwardly with respect to the central line CL, the opening/closing lever 112 passes through the guide groove 360 while contacting the guide surface 357, and moves into the insertion opening 52. At this time, the guide surface 359 applies a reaction force (a component of force), which is directed downwardly, to the opening/closing lever 112. Due to this component of force, as the opening/closing lever 112 moves from the opening end 61 toward the shutter open position, the opening/closing lever 112 is offset in the direction of decreasing the vertical error, i.e., is offset downwardly. At this time, the guide surface 357 applies a reaction force (a component of force), which is directed upwardly, to the opening/closing lever 112. Due to this component of force, as the opening/closing lever 112 moves from the opening end 61 toward the shutter open position, the opening/closing lever 112 is offset in the direction of decreasing the vertical error, i.e., is offset upwardly.

The distal end portion of the opening/closing lever 112, which has passed through the guide groove 360 and moved into the insertion opening 52, is made to abut the pushed piece 96 of the lock member 18. When the opening/closing lever 112 moves further toward the shutter open position, the pushed piece 96 is pushed rearward, and the rotating portion 86 rotates in the lock releasing direction against the elastic force of the spring portion 84. Therefore, the locking convex portion 92 moves apart from the locking concave portion 94, and the locking of the shutter member 16 is released.

When the opening/closing lever 112 moves further in the insertion opening 52 toward the shutter open position, the opening/closing lever 112 abuts the pushed portion 81 of the pushing piece 80 of the shutter member 16, and, via the pushing piece 80, pushes the shutter member 16 so as to slide the shutter member 16 toward the open position. At this time, when the vertical error is sufficiently small, or when the vertical error is large, if the opening/closing lever 112 is offset downwardly with respect to the central line CL, the opening/closing lever 112 abuts the portion of the pushing piece 80 from the central portion of the pushed portion 81 to the base side thereof. Further, if the vertical error of the opening/closing lever 112 is large, when the opening/closing lever 112 is offset upwardly with respect to the central line CL, the opening/closing lever 112, due to the operation of the guide surface 359, moves into the insertion opening 52 in a state of being offset toward the base side of the pushing piece 80, and immediately thereafter, abuts the pushed portion 81 of the pushing piece 80. Thus, the opening/closing lever 112 abuts a vicinity of the central portion of the pushed portion 81 of the pushing piece 80. When the opening/closing lever 112, which is abutting the pushed portion 81, moves further toward the shutter open position and pushes the pushed portion 81, the opening/closing lever 112 is urged toward the base side of the pushing piece 80 by the reaction force from the pushed portion 81 which is inclined with respect to the thickness direction. The opening/closing lever 112 can reliably be prevented from moving apart from the pushing piece 80 while the opening/closing lever 112 is in the midst of moving toward the shutter open position.

Further, the shutter member 16 which has abutted the pushing piece 80 moves toward the shutter open position while gradually deforming one side portion of the spring member 20. When the opening/closing lever 112 moves to the shutter open position shown in FIG. 9, the shutter opening/closing mechanism stops the opening/closing lever 112. The shutter member 16 is held at the open position by the opening/closing lever 112, and the window portion 44 is opened. Thus, the drive device can rotate the recording disk 22 by inserting the spindle through the window portion 44 into the cartridge case 30 and connecting the spindle to the center hub 46. Further, the drive device can apply a light beam, magnetism, or the like from the recording/playback head through the window portion 44 to the recording surface at the lower surface side of the recording disk 22, such that information can be written onto or read from this recording surface.

Due to the above-described operations for opening the shutter member 16, the opening/closing lever 112 of the drive device opens only the shutter member 16 which is positioned at the lower side. As can be understood from FIG. 10 as well, the disk cartridge 12B of the present embodiment is structured so as to be completely symmetrical around the axis of symmetry J1. Thus, when information is to be written onto or read from the recording surface at the opposite side of the recording disk 22, it suffices to turn the disk cartridge 12B upside down and load it into the drive device.

At the time of discharging the disk cartridge 12B, the shutter opening/closing mechanism of the drive device moves the opening/closing lever 112, which is holding the shutter member 16 at the open position, from the shutter open position to the standby position. In this way, due to the urging force of the spring member 20, the shutter member 16 follows the opening/closing lever 112 and moves from the open position to the closed position. Substantially simultaneously with the shutter member 16 having moved to the closed position, the opening/closing lever 112 moves apart from the pushing piece 80, and immediately thereafter, moves apart from the pressed pieces 96 of the lock member 18 as well. In this way, the locking convex portion 92 of the lock member 18 fits-into the locking concave portion 94 of the shutter member 16, and the shutter member 16 is locked at the closed position.

In accordance with the above-described disk cartridge 12B relating to the present embodiment, at the time the shutter member 16 is opened, the opening/closing lever 112, which moves from the standby position toward the shutter open position, can be moved from the guide groove 360 into the insertion opening 52. Further, even if the projecting length L of the pushing piece 80 at the shutter member 16 cannot be made sufficiently long with respect to the opening width of the insertion opening 52, the opening/closing lever 112, which moves into the insertion opening 52 from the guide surfaces 357, 359 formed at the guide groove 360, can be made to reliably engage with the pressing piece 80 of the shutter member 16 positioned at the lower side.

The structure of the disk cartridge 12B relating to the present embodiment is particularly suitable to small-sized disk cartridges which are to be loaded into mobile devices or the like (e.g., disk cartridges which house a recording disk of a diameter of 40 mm or less). Even in cases in which the dimensional accuracy of the shutter member and the like at a small-sized disk cartridge and the positional accuracy of the opening/closing lever and the like at a drive device cannot be made to be sufficiently high, the opening/closing lever can reliably be made to abut the pushing piece of the shutter member, and can be prevented from falling away from the pushing piece after having abutted the pushing piece.

A case is described above in which, in the drive device relating to the present embodiment, after the disk cartridge 12B has been inserted to the loaded position in the cartridge holder 120, the opening/closing lever 112 moves along the widthwise direction from the standby position at the outer side of the disk cartridge 12B to the shutter open position, and the shutter member 16 is opened. However, other than such a shutter opening/closing mechanism, the disk cartridge 12B relating to the present embodiment can also be applied to a structure in which, for example, after the opening/closing lever 112 is inserted into the guide groove 360 from the front of the disk cartridge 12B, the opening/closing lever 112 moves along the widthwise direction toward the shutter open position, and carries out the opening operation of abutting the pushing piece 80 of the shutter member 16 within the insertion opening 52.

As described above, in accordance with the disk cartridge relating to the present embodiment, at the time of loading the disk cartridge into a disk drive device, a shutter opening/closing member of the disk drive device can reliably be made to engage with the one shutter member which is to be opened, among the pair of shutter members which are provided correspondingly at the obverse and reverse surfaces of a recording disk.

Next, a disk cartridge 12C of a fourth embodiment of the present invention will be described.

Figure 15:
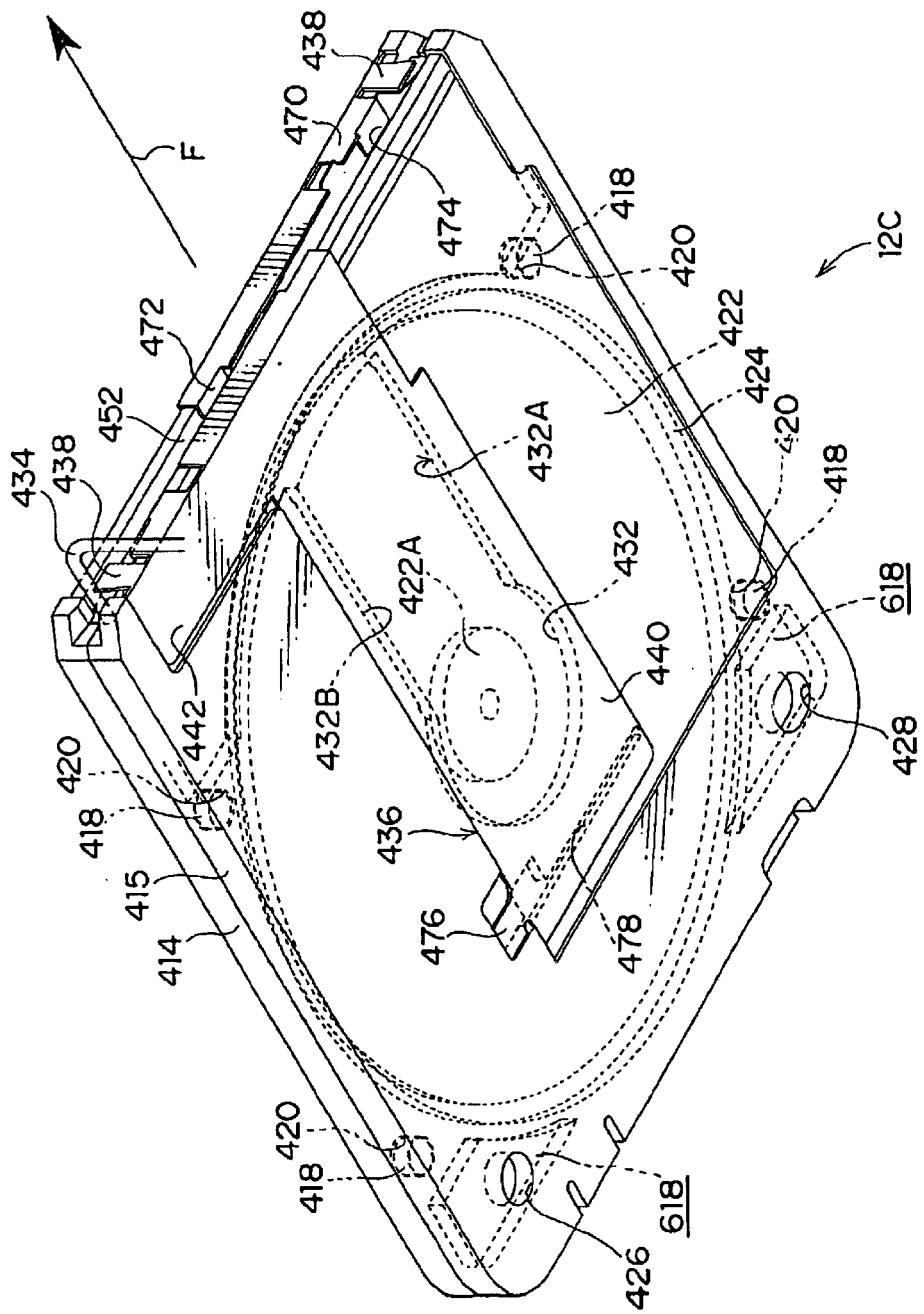
FIG. 15 is a perspective view showing the disk cartridge relating to the embodiments of the present invention.

As shown in FIG. 15, the disk cartridge 12C is formed by superposing two substantially rectangular shells 414, 415. Here, the surfaces of the shell 414 and the shell 415 which are superposed on each other are called the inner surfaces of the shells 414, 415, and the surfaces at the opposite sides are called the outer surfaces of the shells 414, 415.

Projections 418 and fit-together holes 420 are formed in the inner surfaces of the shells 414, 415. When the two shells 414, 415 are superposed, the projections 418 and fit-together holes 420 are fit together and joined together, such that a space for accommodating a recording disk 422 is formed.

The shells 414, 415 have the same configuration, which avoids an increase in the manufacturing costs for molds and ensures ease of assembly. Further, the front-back dimensions (the dimensions along insertion direction F) of the shells 414, 415 are larger than the left-right dimensions thereof, such that the disk cartridge 12C cannot be incorrectly inserted into a drive device (not shown) from the left-right direction thereof.

A circular hole (completely circular reference hole (small sized hole)) 426 and an elongated hole (flat oval reference hole (large sized hole larger than the small sized hole)) 428 for positioning are formed at predetermined positions of the shells 414, 415. When the disk cartridge 12C is loaded into the drive device, as shown in FIG. 16B, a reference positioning pin 614 provided at the drive device is inserted into the circular hole 426, and a positioning pin 616 is inserted into the elongated hole 428.

In this way, the disk cartridge 12C is positioned (as will be described later) in the horizontal direction (the front-back and left-right directions) of the drive device. At this time, due to reference surfaces 614A, 616A, which are provided at the base portions of the reference positioning pin 614 and the positioning pin 616, abutting the outer surface of the shell 415, the disk cartridge 12C is positioned in the vertical direction (up-down direction) of the drive device.

A circumferential wall 424, which accommodates the disc-shaped recording disk 422, stands erect at the substantial center of the inner surface of the shell 414. The circumferential wall 424 holds the recording disk 422 such that the recording disk 422 is rotatable, and prevents entry of dirt and dust.

A keyhole-shaped window portion 432 is formed in the shell 414. A circular portion 432A of the window portion 432 is concentric with the recording disk 422 which is accommodated. From this circular portion 432A, a spindle (not shown) holds and rotates a core portion 422A of the recording disk 422. An opening portion 432B for reading/writing, which is rectangular, is formed continuously from the circular portion 432A so as to reach the circumferential wall 424. A recording/playback head (not shown) of the drive device accesses the recording surface of the recording disk 422 from the opening portion 432B for reading/writing, and reads information from or writes information onto the recording disk 422.

The front surface portion of the shell 414 is thinner than the other three sides of the shell 414, such that a guide groove 452 is formed along the front surface portions of the shells 414, 415 when the shells 414, 415 are superposed. A shutter opening/closing pin 434 of the drive device is inserted into and slides within the guide groove 452.

Two shutters 436, which have the same configurations and which move independently, are disposed at the outer surfaces of the shells 414, 415. Each shutter 436 is formed in a substantial L-shape having a shutter main body portion 440 of a size which can close at least the window portion 432, and a shutter guide portion 442 which extends from the front side of the shutter main body portion 440.

Contact pieces 470, which rise at a substantially right angle from the shutter guide portion 442, are provided erect thereat. Two guide pieces 472, 474, which are parallel to the shutter guide portion 442, are formed from the end portions of the contact pieces 470. Further, a guide piece 476, which extends in the same direction as the shutter guide portion 442 and whose distal end is bent parallel to the shutter main body portion 440, is formed at a vicinity of the rear end of the shutter main body portion 440.

When the shutters 436 are disposed at predetermined positions of the shells 414, 415, the contact pieces 470 and the guide pieces 472, 474 nip the front surface portions of the shells 414, 415, and the guide pieces 476 are inserted into guide holes 478 formed along the left-right direction at the rear of the window portion 432. In this way, the shutters 436 do not inadvertently fall off or joggle.

Shutter operation portions 438 stand erect at the side edge portions of the shells 414, 415 at the final ends in the directions of sliding of the shutters 436. When the shutter opening/closing pin 434 is moved within the guide groove 452, the shutter opening/closing pin 434 contacts the base side of the shutter operation portion 438, and slides the shutter 436. In this way, the opening portion 432B for reading/writing is opened, and information is read from or written onto the recording disk 422.

One lock member (not shown) is disposed between the two shells 414, 415. The lock member has a configuration which has line symmetry, and swings around a rotating portion. When a free end portion side of the lock member is pushed by the distal end of the shutter opening/closing pin 434, the lock member swings around the rotating portion. Locking of the shutter 436 is cancelled, and the shutter 436 can slide. When the pushed state of the free end portion side of the lock member is cancelled, the lock member swings around the rotating portion due to elastic force, and the shutter 436 is locked again.

One spring member (not illustrated) is disposed between the shell 414 and the shell 415 so as to span the widthwise direction length of the front surface portion of the shells 414, 415. The spring member is formed by processing a single wire, and is formed from a rectilinear portion spanning the widthwise direction of the shells 414, 415, and a large loop portion and a small loop portion are formed at each end of the rectilinear portion.

Hook portions, which are folded over substantially at right angles, are formed at the final end portions of the spring member, and are connected to spring receiving portions which are notched out in the guide pieces 472 of the shutters 436. When an attempt is made to move the shutter 436 in the opening direction, the hook portion is pressed by the spring receiving portion such that the spring member deforms, and the spring member exhibits a large elastic force which urges the shutter 436 in the closing direction.

The disk cartridge 12C of the present embodiment is such that both surfaces thereof have the same configuration, such that, by that the disk cartridge 12C can be loaded into a drive device upside-down, the recording surfaces of the recording disk 422 can be accessed from the respective surfaces of the shells 414, 415, and information can be written onto or read from the recording surfaces of the recording disk 422.

The upper and lower shells 414, 415 have the same configurations, the shutters 436 have the same configurations, and one lock member and one spring member are provided for the two shells 414, 415 and the two shutters 436. Accordingly, as compared with a case in which the shells and/or the shutters have respectively different configurations, or a case in which a lock member and a spring member are provided for each of the two shells and shutters, the number of parts is reduced, management of the number of parts is facilitated, and the parts costs can be reduced.

Next, the gist of the disk cartridge relating to the present embodiment will be described.

Figure 16A:
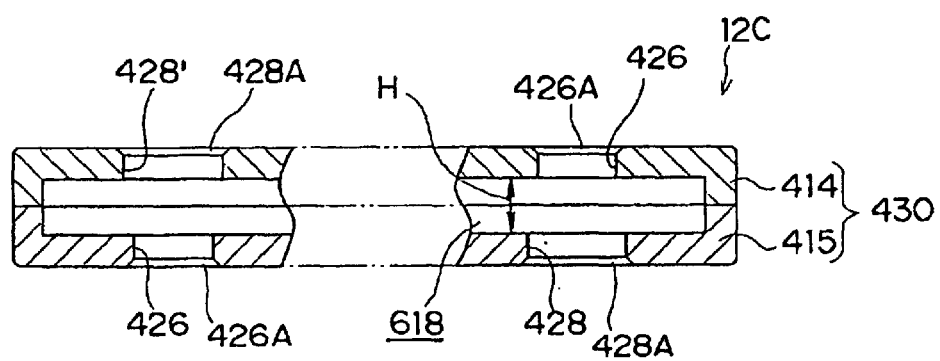
FIGS. 16A and 16B are cross-sectional views showing circular holes and elongated holes carrying out positioning with a drive device, in the disk cartridge relating to the embodiments of the present invention, where
Figure 16B:
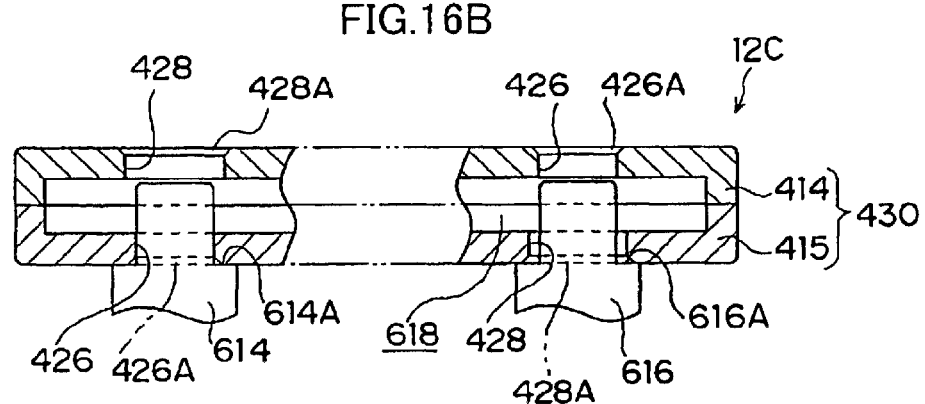

As shown in FIG. 16A, the circular hole (completely circular reference hole) 26 for positioning and the elongated hole (flat oval reference hole) 28 running along the widthwise direction of the disk cartridge 12C, are formed at predetermined positions of the shells 414, 415. Here, the shells 414, 415 have the same configurations, and are superposed such that medium accommodating portions (the circumferential walls) 424 thereof (see FIG. 15) oppose one another. Thus, at the shells 414, 415 which are positioned one on top of the other, the circular holes 26 and the elongated holes 28 communicate.

At the disk cartridge 12C, recording and playback is possible at both surfaces of the recording disk 422 (see FIG. 15). Even if the disk cartridge 12C is turned upside down, the disk cartridge 12C can be loaded into a drive device (not shown).

When the disk cartridge 12C is loaded into the drive device, as shown in FIG. 16B, the disk cartridge 12C is positioned by the reference positioning pin 614 and the positioning pin 616 disposed at the drive device.

Namely, when the disk cartridge 12C is loaded in the drive device, the reference positioning pin 614 is inserted into the circular hole 426 formed in the shell 414, the positioning pin 616 is inserted into the elongated hole 428, and the disk cartridge 12C is positioned within the drive device. The positional offset between the circular hole 426 and the reference positioning pin 614 is absorbed by the elongated hole 428. In this way, the disk cartridge 12C is positioned in the horizontal direction (the front-back direction and the left-right direction) of the drive device.

Further, in this state, due to the reference surfaces 614A, 616A, which are provided at the base portions of the reference position pin 614 and the positioning pin 616, abutting the outer surface of the shell 415, the disk cartridge 12C is positioned in the vertical direction (up-down direction) of the drive device.

Here, taper portions 426A, 428A are provided at the inner edge portions of the circular holes 426 and the elongated holes 428 positioned at the outer surfaces sides of the shells 414, 415. Due to the taper portions 426A, 428A, the edges of the distal end portions of the positioning pins 614, 616 do not gall the inner edge portions of the circular hole 426 and the elongated hole 428.

As shown in FIG. 16A, the inner surfaces of the shells 414, 415 are recessed such that the peripheral portions of the circular holes 426 and the elongated holes 428 are thin. In this way, in the state in which the shell 414 and the shell 415 are superposed (in the state in which the circular holes 426 and the elongated holes 428 communicate), a space 618 arises between the inner surface of the shell 414 and the inner surface of the shell 415.

As shown in FIG. 16B, a distance H by which the peripheral portion of the circular hole 426 and the peripheral portion of the elongated hole 428 are separated from one another is a length such that the distal end portion of the positioning pin 616 can be accommodated within the space 618 when the disk cartridge 12C is positioned within the drive device.

In this way, even if the distal end portion of the positioning pin 616 passes through the elongated hole 428 formed in the shell 414 and reaches the inner surface side of the shell 415, the distal end portion of the positioning pin 616 does not interfere with the shell 415, because the distal end portion of the positioning pin 616 is positioned in the space 618 provided between the elongated hole 428 and the circular hole 426 which communicate with one another. Accordingly, the distal end portion of the positioning pin 616 does not engage with the circular hole 426, and no galling arises between the distal end portion of the positioning pin 616 and the circular hole 426.

Further, by forming the peripheral portions of the circular holes 426 and the elongated holes 428 to be thin, no shrinkage cavities arise at the peripheral portions of the circular holes 426 and the elongated holes 428, and the dimensional accuracy of the circular holes 426 and the elongated holes 428 can be improved.

Here, although the peripheral portions of the circular holes 426 and the elongated holes 428 are formed to be thin, it suffices to provide a space, between the circular hole 426 and elongated hole 428 which communicate with each other, such that the distal end portion of the positioning pin 616 does not interfere at the time the disk cartridge 12C is positioned in the drive device. Thus, it is not absolutely necessary to make the peripheral portions of the circular holes 426 and the elongated holes 428 thin and to provide the space 618 between the peripheral portions of the circular holes 426 and the peripheral portions of the elongated holes 428.

Figure 17A:
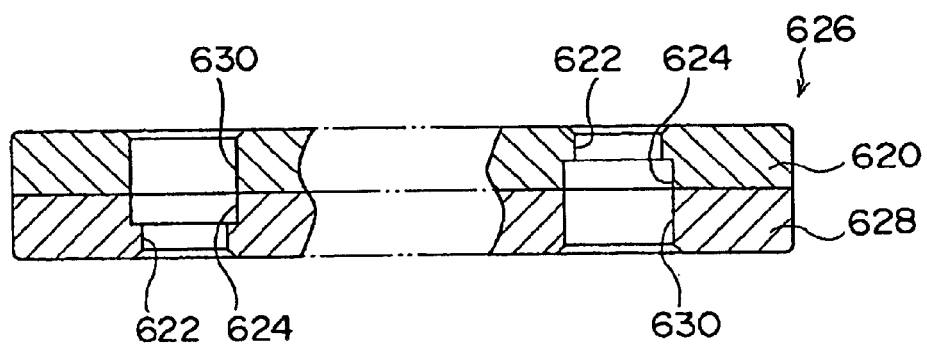
FIGS. 17A and 17B are cross-sectional views showing another example of the circular holes and the elongated holes carrying out positioning with a drive device, in the disk cartridge relating to the embodiments of the present invention, where
Figure 17B:
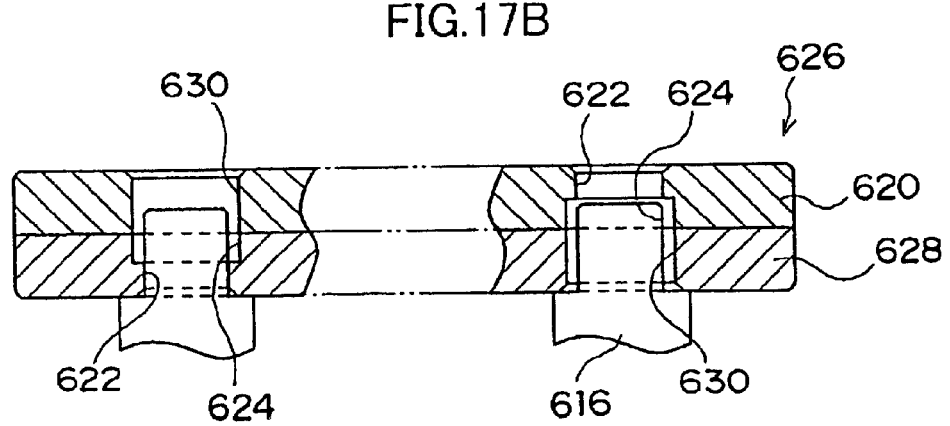
Figure 18A:
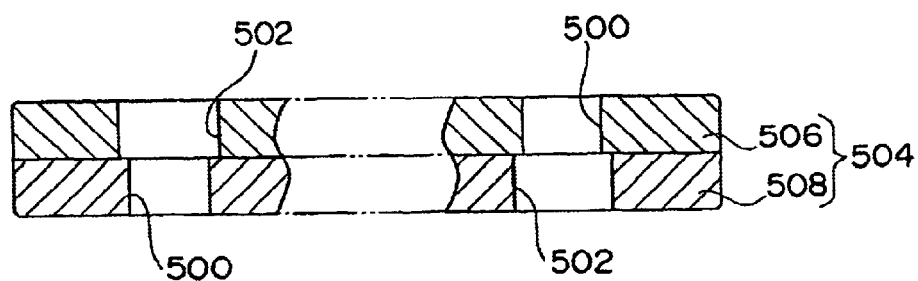
FIGS. 18A and 18B are cross-sectional views showing an example of circular holes and elongated holes carrying out positioning with a drive device, in a conventional disk cartridge, where
Figure 18B:
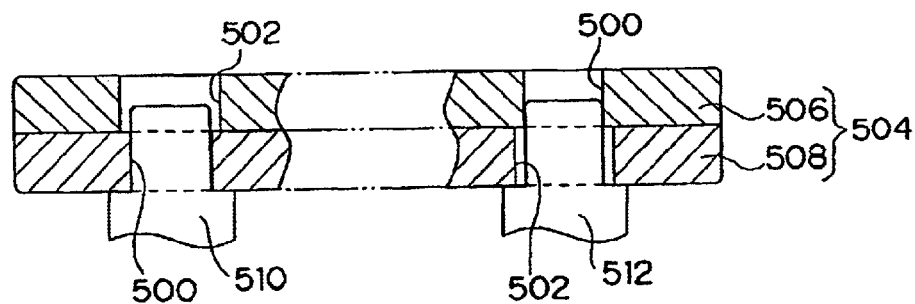

For example, as shown in FIGS. 17A and 17B, at a circular hole 622 formed in a shell 620, an elongated hole 624 communicating with the circular hole 622 may be formed at the inner surface side of the shell 620. The elongated hole 624 has a larger inner diameter dimension than the circular hole 622. The depth of the elongated hole 624 is a depth such that the distal end portion of the positioning pin 616 can be accommodated within the elongated hole 624 when a disk cartridge 626 is positioned within the drive device.

In this way, even if the distal end portion of the positioning pin 616 passes through an elongated hole 630 formed in a shell 628 and reaches the inner surface side of the shell 620, the distal end portion of the positioning pin 616 is positioned within the elongated hole 624. Therefore, the distal end portion of the positioning pin 616 does not reach the circular hole 622. Thus, the distal end portion of the positioning pin 616 does not engage with the circular hole 622, and no galling arises between the distal end portion of the positioning pin 616 and the circular hole 622.

The present embodiment has the above-described structure. Thus, even if the distal end portion of the positioning pin passes through the flat oval reference hole formed from the other surface of the case, by providing a space between the completely circular reference hole and the flat oval reference hole, the distal end portion of the positioning pin does not engage with the completely circular reference hole, and no galling arises between the distal end portion of the positioning pin and the completely circular reference hole.

Next, a disk cartridge 12D of a fifth embodiment of the present invention will be described. The basic structure of the disk cartridge 12D of the fifth embodiment is substantially similar to that of the disk cartridge 12C relating to the fourth embodiment. Therefore, the same portions are designated by the same reference numerals, and description thereof is omitted.

Figure 19:
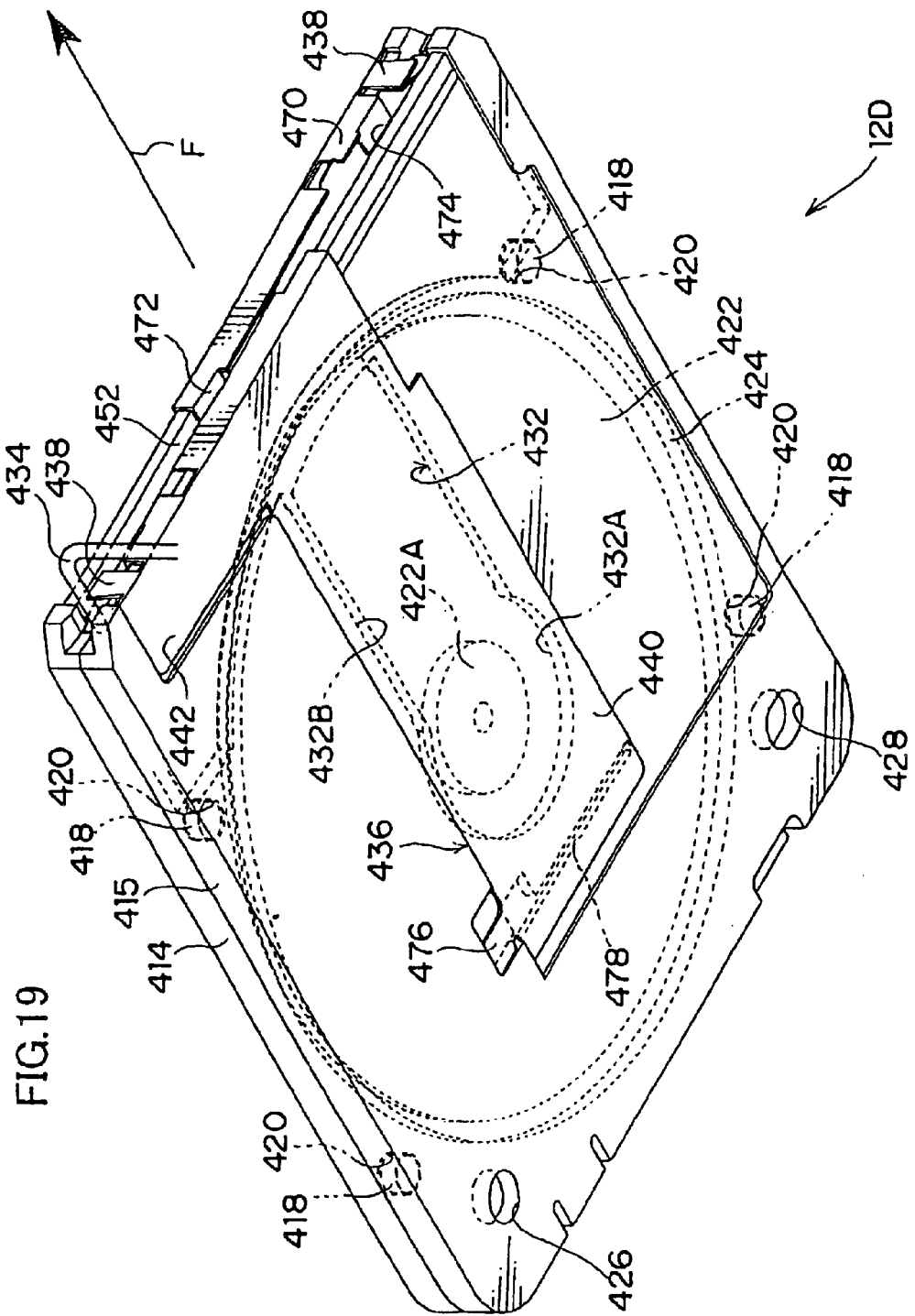
FIG. 19 is a perspective view showing the disk cartridge relating to the embodiments of the present invention.
Figure 20:
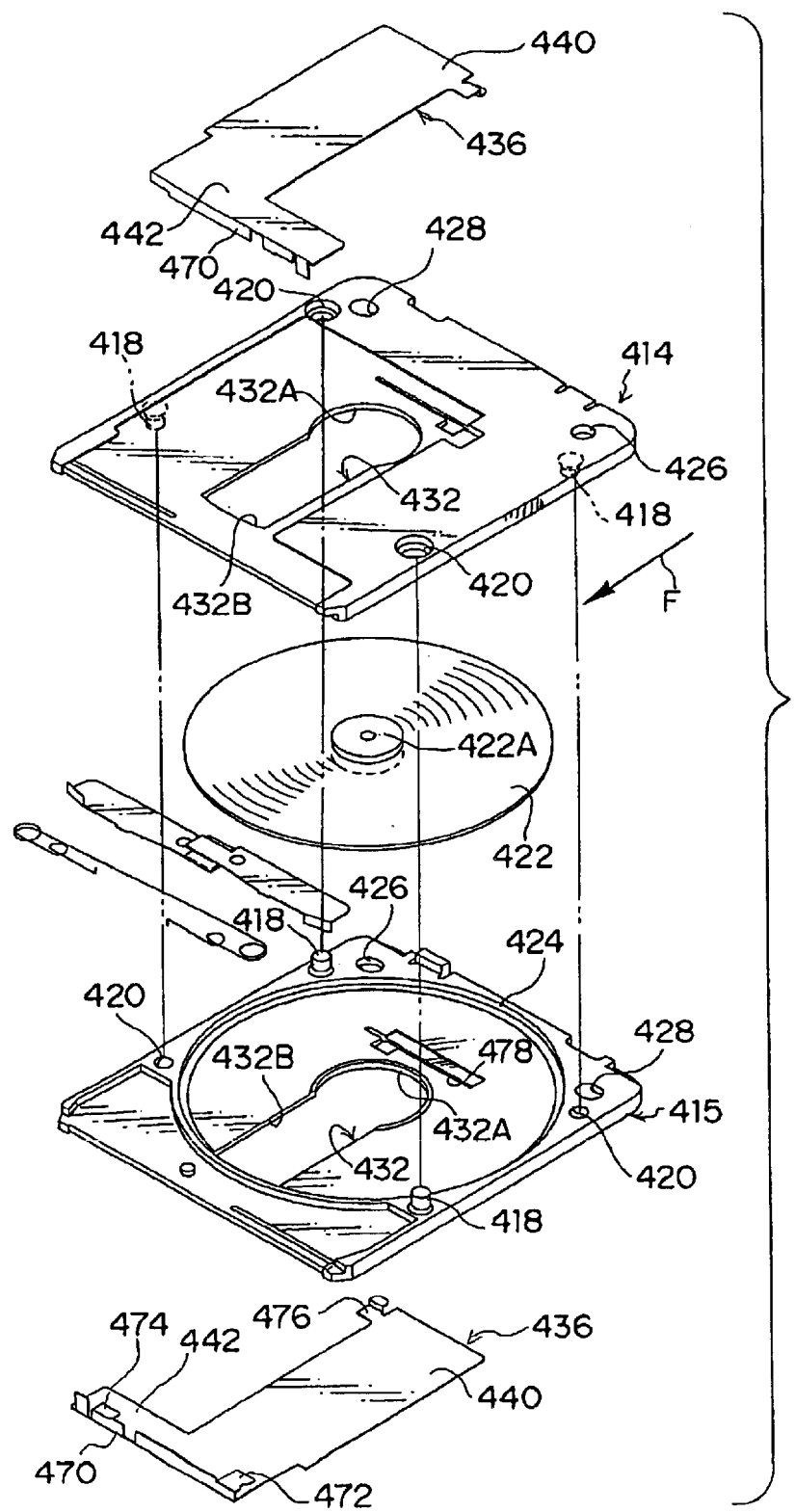
FIG. 20 is an exploded perspective view showing a recording disk and the disk cartridge relating to the embodiments of the present invention.

As shown in FIGS. 19 and 20, the pairs of the projections 418 and the fit-together holes 420 are formed at the front and the back, and the left and the right, of the shells 414, 415, in vicinities of the circumferential walls 424 which are formed at the inner surfaces of the shells 414, 415 and accommodate the recording disk 422. The projections 418 and the fit-together holes 420 are disposed so as to be disposed on diagonal lines with respect to one another.

Here, description will be given of the fit-together hole 420 formed at the shell 414 (or the shell 415) and the projection 418 formed at the shell 415 (or the shell 414). The fit-together hole 420 passes through the shell 414 (or the shell 415). A fit-together portion 454, whose inner diameter is substantially the same as the outer diameter of the projection 418, is formed at the inner surface side, of the shell 414 (or the shell 415), of the fit-together hole 420.

In this way, when the shell 414 and the shell 415 are superposed, the projections 418 formed at the shell 415 fit-together with the fit-together portions 454 of the fit-together holes 420 formed in the shell 414, and the projections 418 formed at the shell 414 fit-together with the fit-together portions 454 of the fit-together holes 420 formed in the shell 415. In this way, the shell 414 and the shell 415 can be joined and temporarily fastened together (see FIG. 19).

In this way, in the state in which the shell 414 and the shell 415 are temporarily fastened together, by making an adhesive or the like flow-in so as to fix the shells 414, 415 together, the shell 414 and the shell 415 can be made integral in a state in which the positions thereof are restricted. Thus, the highly precise disk cartridge 12D (see FIG. 19) can be obtained.

Further, in the state in which the projections 418 and the fit-together portions 454 are fit-together, the temporarily fastened state can be maintained. Thus, after various quality inspections have been carried out on the assembled (but not yet fixed) disk cartridge 12D, it is possible to ultimately fix only the disk cartridges 12D which have passed inspection. If the disk cartridge 12D has not passed inspection, the disk cartridge 12D can be disassembled merely by releasing the fit-together state of the projections 418 and the fit-together portions 454. Thus, those parts which are reusable can be used again, and the production loss can be reduced.

Figure 21A:
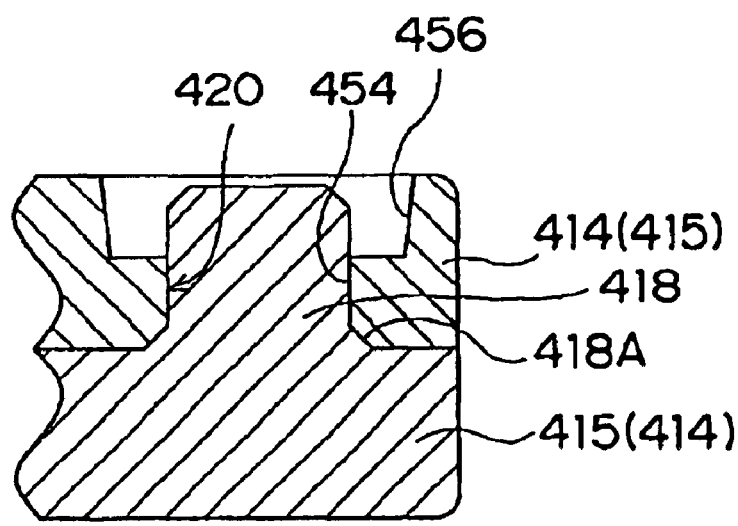
FIGS. 21A and 21B are cross-sectional views showing fit-together holes and projections which engage shells provided at the disk cartridge relating to the embodiments of the present invention, where
Figure 21B:
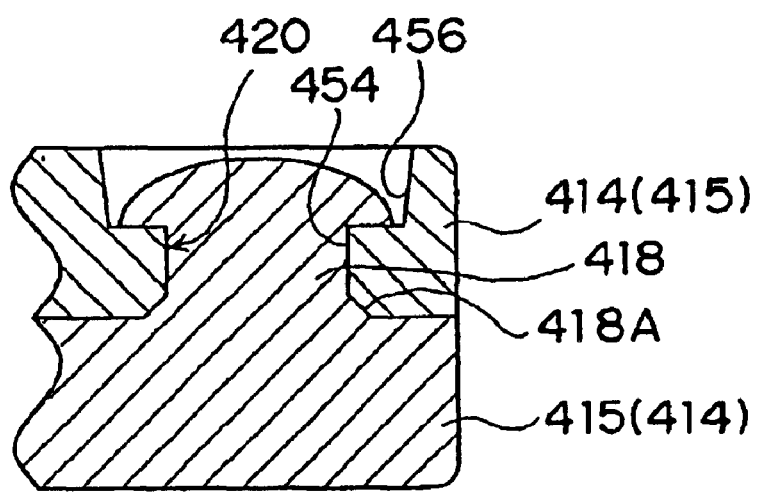

Moreover, by making the fit-together holes 420 be through-holes, the distal end portions of the projections 418 are exposed at the outer surface sides of the shells 414, 415. The shells 414, 415 can be fixed together by fusing and deforming the distal end portions of the projections 418, as shown in FIG. 21B.

Thus, the shells 414, 415 can be fixed together not only by fixing by an adhesive, but also by ultrasonic welding. In this case, it suffice to deform only the distal end portions of the projections 418. Thus, it is possible to use less vibration energy which is applied by the ultrasonic welding, the generation of dust can be suppressed, and there are few effects on the disk cartridge 12D.

Moreover, large diameter portions 456, which have larger diameters than those of the fit-together portions 454, are provided at the outer surface sides of the shells 414, 415, such that the fit-together holes 420 have a stepped structure. In this way, because the leading end portions of the deformed projections 418 are accommodated in the large diameter portions 456, the projections 418 are prevented from being pulled out, and the fixing strength can be ensured. Moreover, the distal end portions of the projections 18 which have been melted do not project out from the outer surface sides of the shells 414, 415.

Here, providing tapers, whose diameters increase from the inner surface sides of the shells 414, 415 toward the outer surfaces sides thereof, at the large diameter portions 456 is even more effective. Moreover, although the shell 414 and the shell 415 are fixed together by ultrasonic welding here, the present embodiment is not limited to the same. The shells 414, 415 may be fixed together by deforming the distal end portions of the projections 418 by heat caulking or the like.

A C-surface portion 418A is provided at the base portion of the projection 418. Due to the shells 414, 415 being fixed together, excessive force is applied to the base portion of the projection 418 due to the vibration energy which is applied by the ultrasonic welding, and there is the concern that the projection 418 may break or the like. Thus, by providing the C-surface portion 418A at the base portion of the projection 418 (by chamfering the base portion), the projection 418 is reinforced and is made difficult to break. Note that an R portion (round portion having radius) may be provided at the base portion side, because it suffices to make the projection 418 difficult to break.

Because the present embodiment has the above-described structure, by fitting together opposing convex portions and concave portions, the pair of shells can be temporarily fastened. This temporarily fastened state can be maintained, such that the shells do not separate from one another, up to the time that ultrasonic welding is carried out. Thus, it is possible to, after various quality inspections have been carried out on the assembled (but not fixed) disk cartridge, ultimately fix only those disk cartridges which have passed inspection. If there is a disk cartridge which has not passed inspection, the disk cartridge can be disassembled merely by canceling the fit-together state of the convex portions and the concave portions. Thus, those parts which can be reused can be utilized again, and the production loss can be reduced.

What is claimed is:

1. A disk cartridge comprising:

a case accommodating a disk medium whose both surfaces are utilized by the case being inverted;

circular reference holes provided at both surfaces of the case; and flat oval reference holes provided at the both surfaces of the case, wherein a space is provided between one of the circular reference holes, which is formed from one surface of the case, and one of the flat oval reference holes, which is from an opposing surface of the case, such that a distal end portion of a positioning pin of a drive device, which is inserted into said one of the circular reference holes for carrying out positioning of the case, does not engage said one of the flat oval reference holes.

2. The disk cartridge according to claim 1, wherein said one of the flat oval reference holes includes the space, and a dimension, in a thickness direction of the disk medium, said one of the flat oval reference holes is set such that a tip end of the positioning pin is accommodated within the one of said flat oval reference holes when the positioning pin is inserted.

3. The disk cartridge according to claim 1, a dimension, in a thickness direction of the disk medium, of the space is set such that a tip end of the positioning pin is accommodated within the space when the positioning pin is inserted.

4. A disk cartridge comprising:
- a case accommodating a disk medium whose both surfaces are utilized by the case being inverted;
- a first circular reference hole provided at one surface of the case;
- a second circular reference hole provided at an opposing surface of the case;
- a first flat oval reference hole provided at the opposing surface of the case; and
- a second flat oval reference hole provided at the one surface of the case;
- wherein a space is provided between the first circular reference hole and the first flat oval reference hole, and between the second circular reference hole and the second flat oval reference hole, such that a distal end portion of a first positioning pin of a drive device, which is inserted into the first circular reference hole for carrying out positioning of the case, does not engage the first flat oval reference hole, and a distal end portion of a second positioning pin of the drive device, which is inserted into the second flat oval reference hole for carrying out positioning of the case, does not engage the second circular reference hole.

5. A disk cartridge comprising:
- a case accommodating a disk medium whose both surfaces are utilized by the case being inverted;
- a first circular reference hole provided at one surface of the case;
- a second circular reference hole provided at an opposing surface of the case;
- a first flat oval reference hole provided at the opposing surface of the case; and
- a second flat oval reference hole provided at the one surface of the case;
- wherein a first space is provided between the first circular reference hole and the first flat oval reference hole, and a second space is provided between the second circular reference hole and the second flat oval reference hole, such that a distal end portion of a first positioning pin of a drive device, which is inserted into the first circular reference hole for carrying out positioning of the case, does not engage the first flat oval reference hole, and a distal end portion of a second positioning pin of the dirve device, which is inserted into the second flate oval reference hole for carrying out positioning of the case does not engage the second circular reference hole.

* * * * *